US012659247B2

(12) United States Patent
Huang et al.

(10) Patent No.: US 12,659,247 B2
(45) Date of Patent: Jun. 16, 2026

(54) COMMUNICATION METHOD AND COMMUNICATION APPARATUS

(71) Applicant: HUAWEI TECHNOLOGIES CO., LTD., Shenzhen (CN)

(72) Inventors: Xietian Huang, Shanghai (CN); Yaoguang Wang, Shanghai (CN); Longyu Cao, Shanghai (CN); Fangyu Ye, Shanghai (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 77 days.

(21) Appl. No.: 18/740,939

(22) Filed: Jun. 12, 2024

(65) Prior Publication Data

US 2024/0333619 A1      Oct. 3, 2024

Related U.S. Application Data

(63) Continuation of application No. PCT/CN2022/137969, filed on Dec. 9, 2022.

(30) Foreign Application Priority Data

Dec. 20, 2021    (CN) .......................... 202111567007.8

(51) Int. Cl.
    *H04L 43/0817*        (2022.01)
    *H04L 41/50*          (2022.01)
    *H04L 43/04*          (2022.01)
(52) U.S. Cl.
    CPC ...... *H04L 43/0817* (2013.01); *H04L 41/5077* (2013.01); *H04L 43/04* (2013.01)
(58) Field of Classification Search
    CPC . H04L 43/0817; H04L 41/5077; H04L 43/04; H04L 41/0816; H04L 41/0806;
        (Continued)

(56) References Cited

U.S. PATENT DOCUMENTS 6,728,313 B1 *   4/2004   Tu .......................... H04N 19/61
                                                          375/240.03
2010/0232455 A1 *   9/2010   Watanabe ............. H04W 28/06
                                                          370/477
(Continued)

FOREIGN PATENT DOCUMENTS

CN        109194647 A        1/2019
CN        108685570 B        1/2021
            (Continued)

OTHER PUBLICATIONS

3GPP TS 28.550, "3rd Generation Partnership Project; Technical Specification Group Services and System Aspects; Management and Orchestration; Performance Assurance (Release 16)", 3GPP Organizational Partners, Dec. 2020, V16.7.0, 85 pages.

(Continued)

*Primary Examiner* — Philip C Lee

(74) *Attorney, Agent, or Firm* — Maier & Maier, PLLC

(57)            ABSTRACT

A communication method and a communication apparatus, and the communication method may include: a first communication apparatus obtains first data, where the first data may be network measurement data; the first communication apparatus obtains second data in a first processing manner based on the first data, where the second data is partial data of the first data, the second data is used to obtain third data, and an error between the third data and the first data is less than or equal to a target threshold; and the first communication apparatus sends the second data to a second communication apparatus. Accordingly, overheads for reporting the network measurement data can be reduced and utilization of network resources can be improved.

16 Claims, 12 Drawing Sheets

(58) Field of Classification Search
CPC ..... H04L 43/028; H04L 43/067; H04L 41/50; H04W 24/08; H04W 24/10
See application file for complete search history.

(56) References Cited

U.S. PATENT DOCUMENTS

| | | | | |
|---|---|---|---|---|
| 2018/0192066 A1* | 7/2018 | Haimi-Cohen | ........ | H04N 19/94 |
| 2018/0295069 A1* | 10/2018 | Smith | .................... | H04L 65/61 |
| 2019/0312591 A1* | 10/2019 | Sample | .............. | G06F 11/0709 |
| 2021/0273747 A1 | 9/2021 | MacKenzie et al. | | |

FOREIGN PATENT DOCUMENTS

| | | | | | | |
|---|---|---|---|---|---|---|
| CN | 113660293 A | | 11/2021 | | | |
| GB | 2592429 A | * | 9/2021 | ........... | H04L 27/364 |
| WO | WO-2013186228 A2 | * | 12/2013 | ......... | H04L 41/5067 |
| WO | 2021160111 A1 | | 8/2021 | | | |

OTHER PUBLICATIONS

Balcan et al., "Noise-Tolerant Life-Long Matrix Completion via Adaptive Sampling", arXiv:1612.00100v1 [cs.LG], Dec. 1, 2016, 24 pages.
TR-069 CPE WAN Management Protocol, "Issue: Amendment 6 Corrigendum 1", Broadband Forum, Jun. 2020, CWMP Version: 1.4, 276 pages.

* cited by examiner

COMMUNICATION METHOD AND COMMUNICATION APPARATUS

CROSS-REFERENCE TO RELATED APPLICATION

This application is a continuation of International Application No. PCT/CN2022/137969, filed on Dec. 9, 2022, which claims priority to Chinese Patent Application No. 202111567007.8, filed on Dec. 20, 2021. The disclosures of the aforementioned applications are hereby incorporated by reference in their entireties.

TECHNICAL FIELD

The embodiments relate to the field of communication technologies, a communication method, and a communication apparatus.

BACKGROUND

Network operations, administration, and maintenance (OAM) refers to production organization and administration activities taken to ensure normal, secure, and effective running of a telecommunication network and service. To maintain and ensure high availability of a communication service and continuously optimize a system architecture to improve deployment efficiency, a measurement task control service producer supports collecting network measurement data based on a fixed measurement periodicity and sending the collected network measurement data to a measurement task control consumer based on a fixed reporting periodicity. The measurement task control consumer can analyze the network measurement data, to learn of a running status of each aspect of the network, and learn of running quality, routine maintenance, problem locating, and the like of each service.

As a requirement for precision of the network measurement data continuously increases, the measurement periodicity needs to be correspondingly shortened. However, shortening the measurement periodicity increases an amount of to-be-reported network measurement data, increases network overheads, causing problems of network congestion and a failure in reporting the measurement data.

SUMMARY

The embodiments provide a communication method and a communication apparatus, to reduce overheads for reporting network measurement data, improve utilization of network resources, and improve precision of the network measurement data.

According to a first aspect, the embodiments may provide a communication method. The method may be performed by a first communication apparatus or may be performed by a component (such as a chip or a chip system) of a first communication apparatus. In the method, the first communication apparatus obtains first data; the first communication apparatus obtains second data in a first processing manner based on the first data, where the second data is partial data of the first data, the second data is used to obtain third data, and an error between the third data and the first data is less than or equal to a target threshold; and the first communication apparatus sends the second data to a second communication apparatus.

The first data may be network measurement data. The first data may alternatively be data in another form, for example, a parameter value of a target parameter or image data. A specific implementation form of the first data is not limited in the embodiments.

In the foregoing embodiment, the second data is the partial data of the first data. A smaller transmitted data amount indicates fewer needed network overheads. Therefore, in comparison with sending the first data to the second communication apparatus by the first communication apparatus, a manner in which the first communication apparatus sends the second data to the second communication apparatus can reduce overheads of data transmission and improve utilization of network resources. In this way, when same overheads are consumed, the first communication apparatus may support a measurement periodicity at a second-level granularity, a millisecond-level granularity, or a finer granularity, so that precision of the first data can be improved. The first communication apparatus obtains the second data from the first data in the first processing manner, where the second data is used to obtain the third data, and the error between the third data and the first data is less than or equal to the target threshold. In this way, data accuracy can be ensured, and a network problem locating error or the like caused by low data accuracy can be avoided.

The method may further include: The first communication apparatus receives first information from the second communication apparatus, where the first information includes at least one of the target threshold, a calculation manner, or an identifier of fourth data, the calculation manner is used to determine the error between the third data and the first data, the fourth data is data that needs to be sent by the first communication apparatus, and the second data includes the fourth data; and the first communication apparatus determines the first processing manner based on the first information.

The first communication apparatus may determine, through the first information from the second communication apparatus, a manner of obtaining the second data, a manner of calculating the error between the third data and the first data, an error value allowed by the second communication apparatus, and the like.

The method may further include: The first communication apparatus sends second information to the second communication apparatus, where the second information includes a first data recovery manner, the first data recovery manner corresponds to the first processing manner, and the first data recovery manner is used to obtain the third data based on the second data; or the second information includes an identifier of the first processing manner.

The first communication apparatus may flexibly indicate, to the second communication apparatus in a plurality of manners, a manner of obtaining the third data based on the second data, so that the second communication apparatus can obtain the third data in a manner corresponding to the first processing manner.

The first information may further include an identifier of the first processing manner, and that the first communication apparatus determines the first processing manner based on the first information may be: The first communication apparatus determines the first processing manner based on the identifier of the first processing manner.

The first communication apparatus may process the first data in a processing manner specified by the second communication apparatus, to obtain the second data.

The method may further include: The first communication apparatus sends third information to the second communication apparatus, where the third information includes an identifier of one or more processing manners supported by the first communication apparatus, and the identifier of the one or more processing manners includes the identifier of the first processing manner.

The first communication apparatus may send, to the second communication apparatus, the identifier of the one or more processing manners supported by the first communication apparatus and may support the second communication apparatus in specifying the first processing manner.

The method may further include: The first communication apparatus sends fourth information to the second communication apparatus, where the fourth information includes at least one of the error between the third data and the first data and a ratio of a data amount of the second data to a data amount of the first data. Optionally, the method may further include: The first communication apparatus receives an updated target threshold from the second communication apparatus.

The first communication apparatus may send, to the second communication apparatus, the fourth information indicating a processing effect of the first processing manner. In this way, the second communication apparatus may determine, through the fourth information, whether to update the target threshold and a manner of updating the target threshold, for example, reduce the target threshold to further reduce overheads, or increase the target threshold to increase accuracy of the third data.

The first communication apparatus is an element management apparatus, and the second communication apparatus is a network management apparatus; or the first communication apparatus is an access network element, and the second communication apparatus is an element management apparatus; or the first communication apparatus is an access network element, and the second communication apparatus is a network management apparatus; or the first communication apparatus is a customer premises equipment, and the second communication apparatus is an auto-configuration server.

According to a second aspect, the embodiments may provide a communication method. The method may be performed by a second communication apparatus or may be performed by a component (such as a chip or a chip system) of a second communication apparatus. In the method, the second communication apparatus receives second data from a first communication apparatus, where the second data is partial data of first data; and the second communication apparatus obtains third data in a first data recovery manner based on the second data, where a difference between the third data and the first data is less than or equal to a target threshold.

The first data may be network measurement data. The first data may alternatively be data in another form, for example, a parameter value of a target parameter or image data. An implementation form of the first data is not limited in the embodiments.

The method may further include: The second communication apparatus sends first information to the first communication apparatus, where the first information includes at least one of the target threshold, a calculation manner, or an identifier of fourth data, the calculation manner is used to determine the error between the third data and the first data, the fourth data is data that needs to be sent by the first communication apparatus, and the second data includes the fourth data.

The first communication apparatus is an access network element, the second communication apparatus is an element management apparatus, and the method may further include:

The second communication apparatus sends the third data to a network management apparatus.

When the first communication apparatus is the access network element and the second communication apparatus is the element management apparatus, network resources between the element management apparatus and the network management apparatus are abundant. After obtaining the third data, the element management apparatus may send the third data to the network management apparatus in a manner of full data reporting, a quantity of times that the network measurement data is compressed is reduced.

The method may further include: The second communication apparatus receives the first information from the network management apparatus.

After receiving the first information of the network management apparatus, the second communication apparatus may forward the first information to the first communication apparatus, so that the first communication apparatus reports the second data based on the first information.

The method may further include: The second communication apparatus receives second information from the first communication apparatus, where the second information includes the first data recovery manner or an identifier of a first processing manner, the first processing manner corresponds to the first data recovery manner, and the first processing manner is used to obtain the second data from the first data; and the second communication apparatus determines the first data recovery manner based on the second information.

The first information further includes an identifier of a first processing manner, the first processing manner corresponds to the first data recovery manner, the first processing manner is used to obtain the second data from the first data, and the method may further include: The second communication apparatus determines the first data recovery manner based on the identifier of the first processing manner.

The method may further include: The second communication apparatus receives third information from the first communication apparatus, where the third information includes an identifier of one or more processing manners supported by the first communication apparatus, and the identifier of the one or more processing manners includes the identifier of the first processing manner.

The method may further include: The second communication apparatus receives fourth information from the first communication apparatus, where the fourth information includes at least one of an error between the third data and the first data and a ratio of a data amount of the second data to a data amount of the first data.

The method may further include: The second communication apparatus updates the target threshold based on the fourth information; and the second communication apparatus sends an updated target threshold to the first communication apparatus.

The first communication apparatus is an element management apparatus, and the second communication apparatus is a network management apparatus; or the first communication apparatus is an access network element, and the second communication apparatus is an element management apparatus; or the first communication apparatus is an access network element, and the second communication apparatus is a network management apparatus; or the first communication apparatus is a customer premises equipment, and the second communication apparatus is an auto-configuration server.

According to a third aspect, an embodiment provides a communication apparatus. The communication apparatus may be a first communication apparatus and has a function of implementing the first communication apparatus in the first aspect. The function may be implemented by hardware or may be implemented by hardware executing corresponding software. The hardware or the software includes one or more modules corresponding to the function.

A structure of the communication apparatus may include a transceiver module and a processing module. These modules may perform a corresponding function of the first communication apparatus in the first aspect. For details, refer to detailed descriptions in the method example. Details are not described herein again.

A structure of the communication apparatus may include an interface circuit and one or more processors. Optionally, the communication apparatus further includes a memory. The interface circuit is configured to receive and send data and is configured to communicate and interact with another device in a communication system. The one or more processors are configured to support the communication apparatus in performing a corresponding function of the first communication apparatus in the first aspect. The memory is coupled to the one or more processors, and stores program instructions and data that are necessary for the communication apparatus.

A structure of the communication apparatus may include a memory and one or more processors. The memory is coupled to the one or more processors; and the memory is configured to store a computer program or instructions. When the computer program or the instructions are executed by the one or more processors, the communication apparatus is enabled to perform a corresponding function of the first communication apparatus in the first aspect.

According to a fourth aspect, an embodiment provides a communication apparatus. The communication apparatus may be a second communication apparatus and has a function of implementing the second communication apparatus in the second aspect. The function may be implemented by hardware or may be implemented by hardware executing corresponding software. The hardware or the software includes one or more modules corresponding to the function.

A structure of the communication apparatus may include a transceiver module and a processing module. These modules may perform a corresponding function of the second communication apparatus in the second. For details, refer to detailed descriptions in the method example. Details are not described herein again.

A structure of the communication apparatus may include an interface circuit and one or more processors. Optionally, the communication apparatus further includes a memory. The interface circuit is configured to receive and send data and is configured to communicate and interact with another device in a communication system. The one or more processors are configured to support the communication apparatus in performing a corresponding function of the second communication apparatus in the second aspect. The memory is coupled to the one or more processors, and stores program instructions and data that are necessary for the communication apparatus.

A structure of the communication apparatus may include a memory and one or more processors. The memory is coupled to the one or more processors; and the memory is configured to store a computer program or instructions. When the computer program or the instructions are executed by the one or more processors, the communication apparatus is enabled to perform a corresponding function of the second communication apparatus in the second aspect.

According to a fifth aspect, the embodiments may provide a communication system, including the communication apparatus in the third aspect and/or the communication apparatus in the fourth aspect.

According to a sixth aspect, the embodiments may provide a non-transitory computer-readable storage medium. The storage medium stores a computer program or instructions. When the computer program or the instructions are run, the method in the first aspect may be implemented.

According to a seventh aspect, the embodiments may provide a non-transitory computer-readable storage medium. The storage medium stores a computer program or instructions. When the computer program or the instructions are run, the method in the second aspect.

According to an eighth aspect, the embodiments may provide a computer program product. The computer program product includes a computer program (or may be referred to as code or instructions). When the computer program is run, a computer is enabled to perform the method in the first aspect.

According to a ninth aspect, the embodiments may provide a computer program product. The computer program product includes a computer program (or may be referred to as code or instructions). When the computer program is run, a computer is enabled to perform the method in the second aspect.

According to a tenth aspect, the embodiments may provide a chip system. The chip system includes a processor and an interface, configured to support a communication apparatus in implementing the method in the first aspect.

The chip system further includes a memory. The memory is configured to store information and data that are necessary for the communication apparatus. The chip system may include a chip or may include a chip and another discrete component.

According to an eleventh aspect, the embodiments may provide a chip system. The chip system includes a processor and an interface, configured to support a communication apparatus in implementing the method in the second aspect.

The chip system further includes a memory. The memory is configured to store information and data that are necessary for the communication apparatus. The chip system may include a chip or may include a chip and another discrete component.

For beneficial effects of the second aspect to the eleventh aspect, correspondingly refer to the beneficial effects of the first aspect. Details are not described herein again.

DETAILED DESCRIPTION OF THE EMBODIMENTS

The embodiments may provide a communication method and a communication apparatus, to reduce overheads for reporting measurement data, improve utilization of network resources, improve measurement precision, and help effectively monitor and analyze a problem in a network. A method and a device are based on a same concept. Because problem-resolving principles of the method and the apparatus are similar, mutual reference may be made to implementations of the device and the method, and repeated parts are not described again.

It should be noted that, the term "and/or" in embodiments describes an association relationship for describing associated objects and represents that three relationships may exist. For example, A and/or B may represent the following three cases: only A exists, both A and B exist, and only B exists. The character "/" may indicate an "or" relationship between the associated objects. "A plurality of" means two or more. "At least one" means one or more.

In addition, it should be understood that, in the descriptions, terms such as "first" and "second" are merely used for distinguishing and description and cannot be understood as an indication or implication of relative importance or an indication or implication of an order.

A communication scenario to which the embodiments are applicable is first described.

Figure 1:
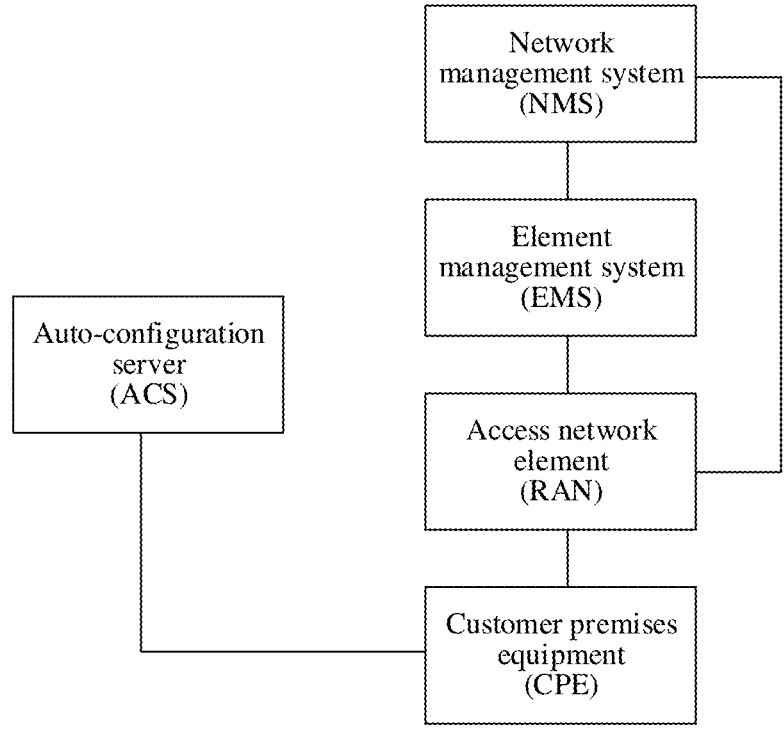
FIG. 1 is a diagram of a communication system according to an embodiment.

FIG. 1 is a diagram of a structure of a communication system to which an embodiment is applicable. As shown in FIG. 1, the communication system 100 includes a network management system (NMS), an element management system (EMS), an access network element (RAN), an auto-configuration server (ACS), and a customer premises equipment (CPE). There is an interface between the NMS and the EMS, and the NMS and the EMS can communicate with each other. There is an interface between the EMS and the RAN, and the EMS and the RAN can communicate with each other. There is an interface between the NMS and the RAN, and the NMS and the RAN can communicate with each other. There is also an interface between the CPE and the ACS, and the CPE and the ACS can communicate with each other.

The NMS may include one or more network management apparatuses (or referred to as network managers). The NMS can provide a network management function and may manage networks in different regions and with different device vendors. A network administrator can comprehensively monitor the networks through the NMS. The NMS can provide basic functions of network management, such as management on fault, configuration, accounting, performance, and security. In the embodiments, the NMS may be used as a measurement task control service consumer and is configured to receive network measurement data from the EMS or the RAN.

The EMS may include one or more element management apparatuses, configured to manage network elements of one or more types. The element management apparatus may be an element manager (EM) or a domain manager (DM). The EM is a network module configured for network element management, and the EM may be disposed on the network element or may be disposed separately. The DM is a management system module with a larger management scope than the EM. For example, the DM can manage one or more EMs. In the embodiments, the EMS may serve as the measurement task control service consumer, configured to receive the network measurement data from the RAN; or may serve as a measurement task control service producer, configured to collect the network measurement data and send the network measurement data to the NMS.

The RAN is a sub-network of an operator network and is an implementation system between a service node and a terminal device in the operator network. To access the operator network, the terminal device first passes through the RAN, and then may be connected to the service node in the operator network through the RAN. A RAN device is a device that provides a wireless communication function for the terminal device, and the RAN device is also referred to as an access network device. The RAN device includes, but is not limited to, a next-generation base station (gNB) in 5G, an evolved NodeB (eNB), a radio network controller (RNC), a NodeB (NB), a base station controller (BSC), a base transceiver station (BTS), a home base station (HNB), a baseband unit (BBU), a transmission point (TRP), a transmission point (TP), a mobile switching center, and the like.

In the embodiments, the RAN may serve as the measurement task control service producer and is configured to collect the network measurement data and send the network measurement data to the NMS or the EMS.

The ACS can be responsible for configuring and managing the CPE and querying a configuration parameter of the CPE. In the embodiments, the ACS may be configured to receive a parameter value sent by the CPE.

The CPE is deployed on a user side and accesses an operator base station through an air interface. The ACS may manage the CPE. In the embodiments, the CPE may be configured to: obtain the parameter value and send the parameter value to the ACS.

The following describes features related to the embodiments.

Figure 2:
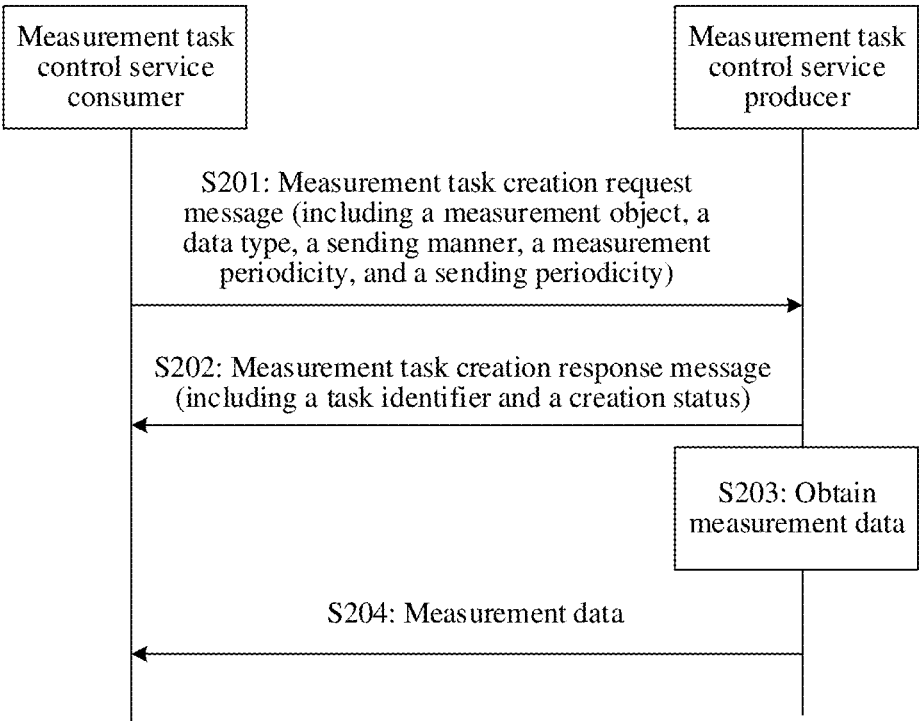
FIG. 2 is a schematic flowchart of a measurement task control service according to an embodiment.

FIG. 2 is a schematic flowchart of a measurement task control service. As shown in FIG. 2, the procedure may include the following content.

S201: A measurement task control service consumer sends a measurement task creation (create measurement job) request message to a measurement task control service producer; and correspondingly, the measurement task control service producer receives the measurement task creation request message.

The measurement task creation request message may be used to request the measurement task control service producer to create a measurement task for a target measurement object. The measurement task creation request message may include one or more of an identifier of a measurement object, a type of network measurement data, a manner of measurement and reporting, a measurement periodicity, and a reporting periodicity.

There may be one or more measurement objects, and the measurement object may be one or more cells managed by the measurement task control service producer.

The type of network measurement data may include, but is not limited to, for example, one or more of an uplink air interface average delay, a downlink air interface average delay, an uplink user average throughput, a downlink user average throughput, uplink physical resource block (PRB) utilization, downlink PRB utilization, an average radio resource control (RRC) connection quantity, and the like.

The reporting manner refers to a manner in which the measurement task control service producer sends the network measurement data to the measurement task control service consumer, for example, reports the network measurement data in a manner of a file or reports the network measurement data in a manner of a data stream.

The measurement periodicity means that the measurement task control service producer can obtain the network measurement data of the measurement object based on the measurement periodicity.

The reporting periodicity means that the measurement task control service producer may send the network measurement data of the measurement object to the measurement task control service consumer based on the reporting periodicity. The reporting periodicity may be an integer multiple of the measurement periodicity. Currently, the measurement periodicity and the reporting periodicity are at a minute-level granularity, such as 5 minutes, 15 minutes, 30 minutes, or 60 minutes.

If the measurement task control service consumer is the NMS, the measurement task control service producer may be the EMS or the RAN; or if the measurement task control service consumer is the EMS, the measurement task control service producer may be the RAN.

S202: The measurement task control service producer sends a measurement task creation response message to the measurement task control service consumer; and correspondingly, the measurement task control service consumer receives the measurement task creation response message.

The measurement task creation response message may include a task identifier and a creation status (for example, a creation success, a creation failure, or a partial creation success). In addition, when the creation fails or the creation partially succeeds, the measurement task creation response message may further include a list of unsupported measurement. Task identifier: After receiving the measurement task creation request message, the measurement task control service producer creates a corresponding measurement task based on a specified parameter and allocates the task identifier. The list of unsupported measurement may include the type of network measurement data and a cause for a creation failure.

Table 1 is used as an example. Creation of a measurement task of a measurement object 1 succeeds. Creation of a measurement task of a measurement object 2 partially succeeds, a type of network measurement data in a creation failure includes network measurement data 1 and network measurement data 2, creation of a measurement task of the network measurement data 1 fails due to a cause 1, and creation of a measurement task of the network measurement data 2 fails due to a cause 2. Creation of a measurement task of a measurement object 3 fails, a type of network measurement data in the creation failure is network measurement data 3, and creation of the measurement task of the network measurement data 3 fails due to a cause 3. Data in Table 1 is merely an example, and an implementation of the measurement task creation response message is not limited thereto. In addition, for ease of description, an example in which creation of a measurement task succeeds is used for description in the embodiments.

TABLE 1

| Identifier of a measurement object | Creation status | Type of network measurement data in a creation failure | Cause |
|---|---|---|---|
| Measurement object 1 | Success | | |
| Measurement object 2 | Partial success | Network measurement data 1 Network measurement data 2 | Cause 1 Cause 2 |
| Measurement object 3 | Failure | Network measurement data 3 | Cause 3 |

S203: The measurement task control service producer obtains the network measurement data.

For example, the measurement task control service producer may collect the network measurement data based on one or more of the identifier of the measurement object, the type of network measurement data, and the measurement periodicity.

S204: The measurement task control service producer sends the network measurement data to the measurement task control service consumer; and correspondingly, the measurement task control service consumer receives the network measurement data.

For example, the measurement task control service producer may send the network measurement data to the measurement task control service consumer based on at least one of the reporting manner and the reporting periodicity. Further, after receiving the network measurement data, the measurement task control service consumer may process the network measurement data, for example, perform network performance analysis and problem locating.

Figure 3:
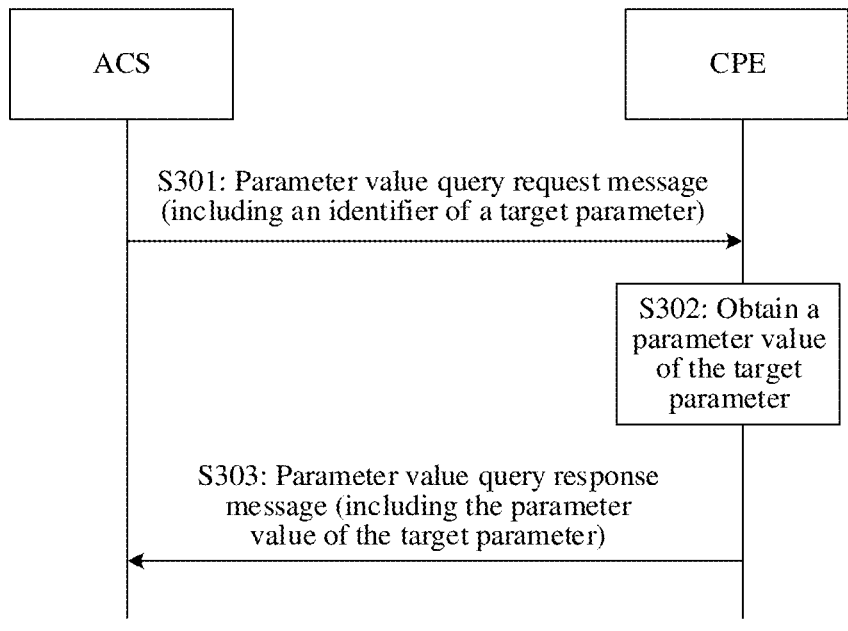
FIG. 3 is a schematic flowchart of a parameter value query service according to an embodiment.

FIG. 3 is a schematic flowchart of a parameter value query service. As shown in FIG. 3, the procedure may include the following content.

S301: An ACS sends a parameter value query (get parameter values) request message to a CPE; and correspondingly, the CPE receives the parameter value query request message. The parameter value query request message may include an identifier of a target parameter, for example, a parameter name of the target parameter. The target parameter may include, but is not limited to, one or more of a total quantity of times of device access, a quantity of failures of device access, a total traffic volume of a downlink service, a total traffic volume of an uplink service, a device uplink delay, a device downlink delay, a device uplink packet loss rate, a device downlink packet loss rate, and the like.

S302: The CPE obtains a parameter value of the target parameter. For example, the CPE obtains the parameter value of the target parameter based on the identifier of the target parameter.

S303: The CPE sends a parameter value query response message to the ACS; and correspondingly, the ACS receives the parameter value query response message. The parameter value query response message carries the parameter value of the target parameter. Further, the ACS may analyze a related problem based on the parameter value of the target parameter, for example, identify a network problem (for example, a problem of a long delay or a high packet loss rate) or locate a problem (for example, locate a problem of a video artifact).

In the measurement task control service shown in FIG. 2, the measurement task control service producer sends the collected network measurement data to the measurement task control service consumer. The network measurement data is at the minute-level granularity, which is not conducive to obtaining high-precision network measurement data. However, if the measurement periodicity is shortened, a data amount of to-be-reported network measurement data is increased, network overheads are increased, and problems including network congestion and a reporting failure of the network measurement data are caused. However, in the parameter value query service shown in FIG. 3, if network resources are tight or there are a large quantity of to-be-transmitted parameter values, problems including the network congestion and a reporting failure of the parameter value are also caused.

In view of this, the embodiments may provide a communication method and a communication apparatus, to reduce overheads for reporting the network measurement data, improve utilization of network resources, and improve precision of the network measurement data.

It should be noted that, the communication method provided in the embodiments may be applied to the measurement task control service scenario shown in FIG. 2, to reduce the overheads for reporting the network measurement data and improve the precision of the network measurement data; may be applied to the parameter value query service scenario shown in FIG. 3, to reduce overheads for reporting the parameter value; or may be applied to another scenario, for example, a scenario of sending image data or a scenario of sending video data, to reduce overheads of to-be-transmitted data. This is not limited in the embodiments. For ease of understanding the embodiments, the following uses the measurement task control service scenario and the parameter value query service scenario as examples for description.

Figure 4:
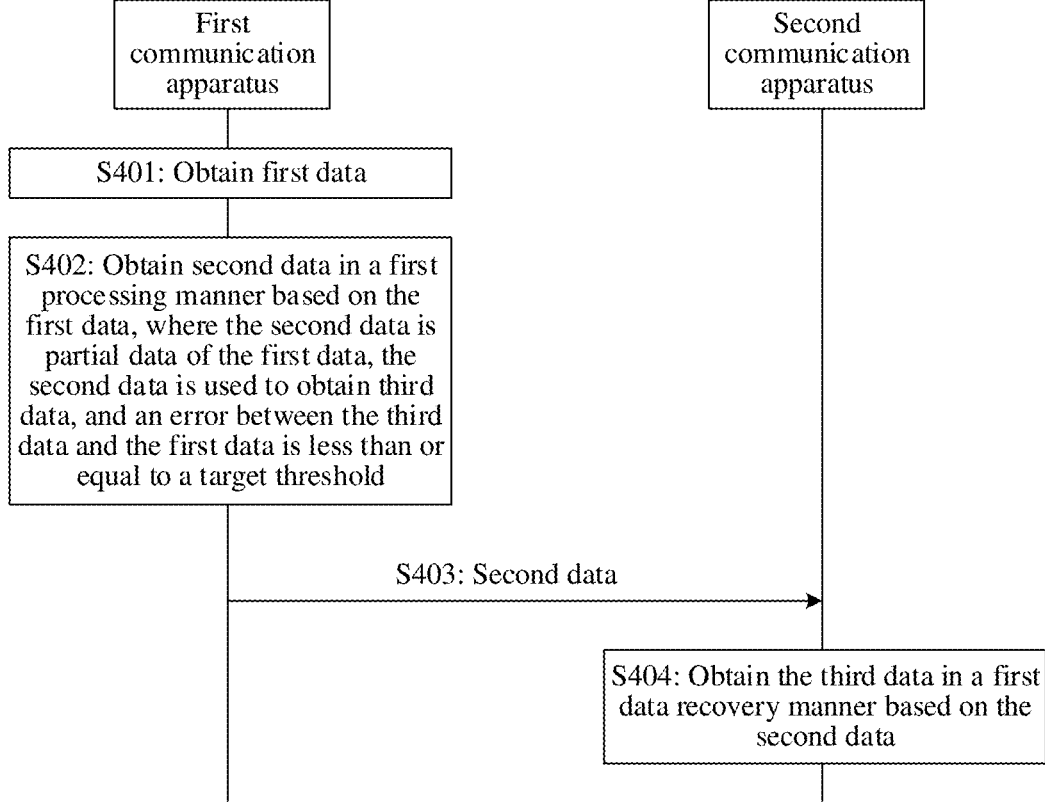
FIG. 4 is a schematic flowchart of a communication method according to an embodiment.

FIG. 4 is a schematic flowchart of a communication method according to an embodiment. The method may be applied to the communication system 100 shown in FIG. 1, for example, applied to a scenario of a measurement task control service between the NMS and the EMS shown in FIG. 1, applied to a scenario of a measurement task control service between the NMS and the RAN shown in FIG. 1, applied to a scenario of a measurement task control service between the EMS and the RAN shown in FIG. 1, or applied to a scenario of a parameter value query service between the ACS and the CPE shown in FIG. 1. For example, a first communication apparatus may be the EMS or a component (such as a chip or a chip system) of the EMS, and a second communication apparatus may be the NMS or a component (such as a chip or a chip system) of the NMS; a first communication apparatus may be the RAN or a component (such as a chip or a chip system) of the RAN, and a second communication apparatus may be the NMS or a component (such as a chip or a chip system) of the NMS; a first communication apparatus may be the RAN (such as a chip or a chip system), and a second communication apparatus may be the EMS or a component (such as a chip or a chip system) of the EMS; or a first communication apparatus may be the CPE or a component (such as a chip or a chip system) of the CPE, and a second communication apparatus may be the ACS or a component (such as a chip or a chip system) of the ACS.

S401: The first communication apparatus obtains first data.

The first data may be network measurement data of a measurement object, a parameter value of a target parameter, image data, video data, or the like. An implementation form of the first data is not limited in the embodiments. The following uses an example in which the first data is the network measurement data of the measurement object or the parameter value of the target parameter for description.

For example, when the first communication apparatus is the EMS or the RAN, the first communication apparatus may collect the network measurement data of the measurement object. When the first communication apparatus is the CPE, the first communication apparatus may collect the parameter value of the target parameter. The measurement object may be one or more cells managed by the first communication apparatus. For example, a type of the network measurement data may include, but is not limited to, one or more of an uplink air interface average delay, a downlink air interface average delay, an uplink user average throughput, a downlink user average throughput, uplink PRB utilization, downlink PRB utilization, an average quantity of RRC connections, and the like. The target parameter may include, but is not limited to, one or more of a total quantity of times of device access, a quantity of failures of device access, a total traffic volume of a downlink service, a total traffic volume of an uplink service, a device uplink delay, a device downlink delay, a device uplink packet loss rate, a device downlink packet loss rate, and the like.

In an example, the first communication apparatus may actively obtain the first data. For example, the first communication apparatus may collect the network measurement data of the measurement object or actively collect the parameter value of the target parameter based on a preconfigured measurement periodicity, the type of the network measurement data, and the like, to obtain the first data. Alternatively, the first communication apparatus may obtain the first data in response to a first request message of the second communication apparatus. For example, the second communication apparatus may send the first request message to the first communication apparatus; and correspondingly, the first communication apparatus receives the first request message. The first request message is used to request to obtain the first data. For example, the first request message may be a measurement task creation request message, a parameter value query request message, or the like. This is not limited in the embodiments. Further, when the first communication apparatus is the EMS or the RAN, the first request message may include, but is not limited to, one or more of an identifier of the measurement object, the type of the network measurement data, a reporting manner, the measurement periodicity, and a reporting periodicity; and correspondingly, after receiving the first request message, the first communication apparatus may collect the network measurement data of the measurement object based on the type of the network measurement data and the measurement periodicity, to obtain the first data. When the first communication apparatus is the CPE, the first request message may include an identifier of the target parameter; and correspondingly, after receiving the first request message, the first communication apparatus may collect the parameter value of the target parameter based on the identifier of the target parameter, to obtain the first data.

It should be noted that, the measurement periodicity and the reporting periodicity in the embodiments may be at a minute-level granularity, a second-level granularity, a millisecond-level granularity, or the like. This is not limited in the embodiments. In addition, for descriptions of the reporting manner and the reporting periodicity, refer to related descriptions in the foregoing step S201. Details are not described herein again.

In an example, the first communication apparatus may send a first response message to the second communication apparatus; and correspondingly, the second communication apparatus receives the first response message. If the first communication apparatus is the EMS or the RAN, the first response message may be a measurement task creation response message. The first response message may include the identifier of the measurement object and a creation status (for example, a creation success, a creation failure, or a partial creation success). When the creation fails or the creation partially succeeds, the first response message may further include one or more of a type of measurement parameter in the creation failure and a cause of the creation failure, as shown in Table 1. If the first communication apparatus is the CPE, the first response message may be a parameter value query response message.

S402: The first communication apparatus obtains second data in a first processing manner based on the first data.

The second data is partial data of the first data. The second data may be used to obtain third data. An error between the third data and the first data is less than or equal to a target threshold. The first processing manner is used to obtain, from original data, partial data of the original data, so that a data amount of to-be-transmitted data can be reduced. The first processing manner may be, for example, a compression algorithm based on column subspace padding, or a compression algorithm based on matrix padding. This is not limited in the embodiments.

It should be noted that, the target threshold in the embodiments may be an error threshold or may be an accuracy threshold. This is not limited in the embodiments. For example, if the target threshold is the error threshold, the error between the third data and the first data is less than or equal to the target threshold. For another example, if the target threshold is the accuracy threshold, accuracy of the third data that is obtained by processing the second data in the first data recovery manner is greater than or equal to the target threshold. For ease of description, the following uses an example in which the target threshold is the error threshold for description.

In addition, the target threshold may be preset, for example, determined by the first communication apparatus based on a data processing capability of the first communication apparatus, or determined based on a reporting status of historical data; or may be indicated by the second communication apparatus, for example, determined by the second communication apparatus based on one or more of a requirement of the second communication apparatus, a bandwidth resource allocation status of the second communication apparatus, a data processing capability of the second communication apparatus, a data processing capability of the first communication apparatus, and the like. This is not limited in the embodiments. For example, the second communication apparatus may send first information to the first communication apparatus, where the first information may include the target threshold; and correspondingly, the first communication apparatus receives the first information. In addition, the first information may be carried in the first request message or may be carried in another message. This is not limited in the embodiments. There may be one or more target thresholds. For example, when there may be a plurality of measurement objects, there may also be a plurality of target thresholds.

Optionally, the first information may further include a calculation manner, include an identifier of fourth data, or include a calculation manner and an identifier of fourth data. The calculation manner may be used to evaluate an actual effect of the first processing manner. For example, the calculation manner may be used to determine the error between the third data and the first data, for example, an average absolute error or a root-mean-square error; or may be used to determine the accuracy of the third data. The fourth data is data that needs to be sent by the first communication apparatus. In other words, the second data includes the fourth data. The identifier of the fourth data may be, for example, a row identifier or a column identifier, and the row identifier or the column identifier corresponds to the type of network measurement data, a measurement time point, or the like.

The first communication apparatus may determine the first processing manner and process the first data in the first processing manner, to obtain the second data. The first communication apparatus supports one or more processing manners, and the first communication apparatus may determine the first processing manner from the one or more processing manners.

For example, the first communication apparatus may determine the first processing manner based on the data processing capability of the first communication apparatus, based on a bandwidth resource allocation status of the first communication apparatus, or based on the data processing capability of the first communication apparatus and a bandwidth resource allocation status of the first communication apparatus. For example, the first communication apparatus may select, from a plurality of processing manners based on the data processing capability of the first communication apparatus, a processing manner corresponding to minimum calculation complexity as the first processing manner. For example, the first communication apparatus may select, from the plurality of processing manners based on the bandwidth resource allocation status of the first communication apparatus, a processing manner corresponding to a minimum data amount of the second data as the first processing manner.

For another example, the first communication apparatus may determine the first processing manner based on the first information. The first communication apparatus may determine, from the plurality of processing manners based on the calculation manner, a processing manner corresponding to a minimum error between the third data and the first data as the first processing manner; determine, from the plurality of processing manners based on the calculation manner, a processing manner corresponding to the highest accuracy of the third data as the first processing manner; or determine, from the plurality of manners based on the target threshold, a processing manner in which the target threshold is met as the first processing manner. This is not limited in the embodiments.

For another example, the first communication apparatus may determine the first processing manner based on an identifier of the first processing manner. For example, the second communication apparatus may send the identifier of the first processing manner to the first communication apparatus. Correspondingly, the first communication apparatus receives the identifier of the first processing manner and determines the first processing manner based on the identifier of the first processing manner. The identifier of the first processing manner may be included in the first information or may be included in other information sent by the second communication apparatus to the first communication apparatus. This is not limited in the embodiments.

The first communication apparatus may report, to the second communication apparatus, an identifier of the one or more processing manners supported by the first communication apparatus. The identifier of the one or more processing manners includes the identifier of the first processing manner. The first communication apparatus may send third information to the second communication apparatus, where the third information may include the identifier of the one or more processing manners supported by the first communication apparatus; and correspondingly, the second communication apparatus receives the third information. Further, the second communication apparatus may determine the first processing manner from the one or more processing manners and send the identifier of the first processing manner to the first communication apparatus. For example, the second communication apparatus may determine, from the one or more processing manners based on the requirement of the second communication apparatus, the data processing capability of the second communication apparatus, the bandwidth resource allocation status of the second communication apparatus, and the like, that one processing manner is the first processing manner. For example, calculation complexity of a data recovery manner corresponding to the first processing manner is the lowest.

For example, the third information may further include one or more data recovery manners (for example, include a calculation formula or a name of the data recovery manner). The one or more data recovery manners are in one-to-one correspondence with the one or more processing manners. For example, when a processing manner is a compression algorithm based on a column subspace, a data recovery manner corresponding to the processing manner may be a data reconstruction formula. The one or more data recovery manners are used to obtain the third data based on the second data. Optionally, the third information may further include calculation complexity of the one or more data recovery manners. The calculation complexity of the one or more data recovery manners may be used to determine the target threshold (where for example, the target threshold is adaptively adjusted based on the calculation complexity and a data processing capability of the second communication apparatus), used to determine the first processing manner (for example, determine a processing manner corresponding to a data recovery manner with a minimum calculation complexity as the first processing manner), or used to determine the target threshold and the first processing manner. In other words, the second communication apparatus may determine the target threshold, determine the first processing manner, or determine the target threshold and the first processing manner based on the calculation complexity.

The first communication apparatus may report, to the second communication apparatus, one or more of the one or more processing manners (for example, a calculation formula or a name of the processing manner) and the one or more data recovery manners that are supported by the first communication apparatus. For example, when receiving the one or more processing manners, the second communication apparatus may determine, based on the one or more processing manners, the one or more data recovery manners corresponding to the one or more processing manners. For another example, after receiving the one or more data recovery manners, the second communication apparatus may determine, based on the one or more data recovery manners, the one or more processing manners corresponding to the one or more data recovery manners.

For example, the third information may include a reference threshold. The reference threshold may be an error threshold, an accuracy threshold, or an error threshold and an accuracy threshold that are estimated by the first communication apparatus based on the reporting status of the historical data and the data processing capability of the first communication apparatus. The reference threshold may be used as a reference for determining the target threshold and/or the first processing manner by the second communication apparatus. In other words, the second communication apparatus may determine the target threshold, determine the first processing manner, or determine the target threshold and the first processing manner based on the reference threshold.

The first communication apparatus may actively send the third information to the second communication apparatus, or may send, in response to a second request message of the second communication apparatus, the third information to the second communication apparatus. For example, the second communication apparatus sends the second request message to the first communication apparatus, where the second request message is used to request to obtain the identifier of the one or more processing manners supported by the first communication apparatus; and correspondingly, after receiving the second request message, the first communication apparatus may send a second response message to the second communication apparatus, where the second response message includes the third information.

S403: The first communication apparatus sends the second data to the second communication apparatus. Correspondingly, the second communication apparatus receives the second data.

For example, the first communication apparatus may send the second data to the second communication apparatus based on at least one of the reporting manner and the reporting periodicity. The reporting periodicity may be at a minute-level granularity, a second-level granularity, a millisecond-level granularity, or the like. This is not limited in the embodiments. In the embodiments, the first communication apparatus sends the partial data of the first data to the second communication apparatus. A smaller data amount of the transmitted data indicates fewer overheads needed for data transmission. Therefore, overheads for data reporting can be reduced, and utilization of network resources can be improved.

In an example, the first communication apparatus may send second information to the second communication apparatus, where the second information may include the identifier of the first processing manner or a first data recovery manner; and correspondingly, the second communication apparatus receives the second information. The second information is used to determine the first data recovery manner. For example, when the first communication apparatus does not send the third information to the second communication apparatus, the first communication apparatus may send the second information to the second communication apparatus. The second information includes the first data recovery manner (for example, a calculation formula of the first data recovery manner or a name of the first data recovery manner), so that the second communication apparatus obtains the first data recovery manner. For another example, when the first communication apparatus sends the third information to the second communication apparatus, the first communication apparatus may send the second information to the second communication apparatus. The second information includes the identifier of the first processing manner. In this way, the second communication apparatus may determine the first data recovery manner based on the identifier of the first processing manner and a correspondence between the first processing manner and the first data recovery manner. The second information and the second data may be carried in one message or may be carried in different messages. This is not limited in the embodiments.

Optionally, the second information may include a data recovery identifier, and the data recovery identifier identifies a location of the second data in the first data. For example, the first processing manner is the compression algorithm based on the column subspace, and the data recovery identifier may be a column identifier of a column subspace of the first data and a location index of the second data in the first data, for example, a row number or a column number.

S404: The second communication apparatus obtains the third data in the first data recovery manner based on the second data.

For example, the second communication apparatus may process the second data in the first data recovery manner, to obtain the third data. For example, the second communication apparatus may determine the first data recovery manner and process the second data in the first data recovery manner, to obtain the third data. For example, when the second communication apparatus receives the second information from the first communication apparatus, the second communication apparatus may determine the first data recovery manner based on the second information. When the second information includes the first data recovery manner, after receiving the second information, the second communication apparatus parses the second information, to obtain the first data recovery manner. When the second information includes the identifier of the first processing manner, after receiving the second information, the second communication apparatus parses the second information, to obtain the identifier of the first processing manner, and determines the first data recovery manner based on the identifier of the first processing manner and the correspondence between the first processing manner and the first data recovery manner. For another example, when the second communication apparatus sends the identifier of the first processing manner to the first communication apparatus, the second communication apparatus may determine the first data recovery manner based on the identifier of the first processing manner, for example, determine the first data recovery manner based on the identifier of the first processing manner and the correspondence between the first processing manner and the first data recovery manner.

In a possible implementation, the first communication apparatus may send fourth information to the second communication apparatus, and correspondingly, the second communication apparatus receives the fourth information. The fourth information may include the error between the third data and the first data (or the accuracy of the third data), include a ratio of a data amount of the second data to a data amount of the first data, or include the error between the third data and the first data and a ratio of a data amount of the second data to a data amount of the first data. For example, the first communication apparatus may obtain the fourth information, and send the fourth information to the second communication apparatus. For example, after obtaining the second data, the first communication apparatus may calculate the error between the third data and the first data (or calculate the accuracy of the third data that is obtained by processing the second data in the first data recovery manner), and calculate the ratio of the data amount of the second data to the data amount of the first data, to obtain the fourth information. The fourth information and the second data may be carried in one message or may be carried in different messages. This is not limited in the embodiments.

For example, the second communication apparatus may update the target threshold based on the fourth information and may send an updated target threshold to the first communication apparatus; and correspondingly, the first communication apparatus receives the updated target threshold. For example, the second communication apparatus may adjust the target threshold based on fourth information in one or more measurement periodicities. For example, if the accuracy of the third data is greater than a target accuracy threshold in a plurality of consecutive measurement periodicities, the second communication apparatus may adaptively increase the target accuracy threshold based on the ratio of the data amount of the second data to the data amount of the first data. For another example, if the error between the third data and the first data is greater than a target error threshold in a plurality of consecutive measurement periodicities, the second communication apparatus may adaptively decrease the target error threshold based on the ratio of the data amount of the second data to the data amount of the first data.

In another possible implementation, the first communication apparatus is the RAN, the second communication apparatus is the EMS, and after obtaining the third data, the second communication apparatus may send the third data to the NMS. For example, the EMS may actively send the third data to the NMS or may send the third data to the NMS in response to a third request message of the NMS. For example, the NMS sends the third request message to the EMS, where the third request message is used to request to obtain the first data, and the third request message may include the first information; and after obtaining the third data, the EMS sends the third data to the NMS. In this implementation, a measurement task control service relates to three network elements: the NMS, the EMS, and the RAN. The RAN and the EMS are a pair of a measurement task control service producer and a measurement task control service consumer, and the EMS and the NMS are a pair of a measurement task control service producer and a measurement task control service consumer. The RAN sends the partial data to the EMS, so that overheads of transmission resources between the RAN and the EMS can be reduced, and transmission resource pressure between the RAN and the EMS can be relieved. Considering that the transmission resources between the EMS and the NMS are abundant, the EMS may report the full third data to the NMS. In this way, a quantity of times of data compression is reduced, and accuracy of reporting data is improved.

The EMS may send the third data to the NMS or may send the second data to the NMS. This is not limited in the embodiments. For example, after receiving the second data, the EMS may forward the second data to the NMS, and then the NMS obtains the third data based on the second data in the first processing manner. In this way, not only the overheads of the transmission resources between the RAN and the EMS can be reduced, but also overheads of the transmission resources between the EMS and the NMS can be reduced.

In the foregoing embodiment, the second data is the partial data of the first data. The smaller data amount of the transmitted data may indicate fewer needed network overheads. Therefore, in comparison with sending the first data to the second communication apparatus by the first communication apparatus, a manner in which the first communication apparatus sends the second data to the second communication apparatus can reduce the overheads of data transmission and improve the utilization of the network resources. In this way, when same overheads are consumed, the first communication apparatus may support a measurement periodicity at a second-level granularity, a millisecond-level granularity, or a finer granularity, so that precision of the first data can be improved. The first communication apparatus obtains the second data from the first data in the first processing manner, where the second data is used to obtain the third data, and the error between the third data and the first data is less than or equal to the target threshold. In this way, data accuracy can be ensured, and a network problem locating error or the like caused by low data accuracy can be avoided.

The following describes in detail the procedure shown in FIG. 4 with reference to FIG. 5 to FIG. 13.

Figure 5:
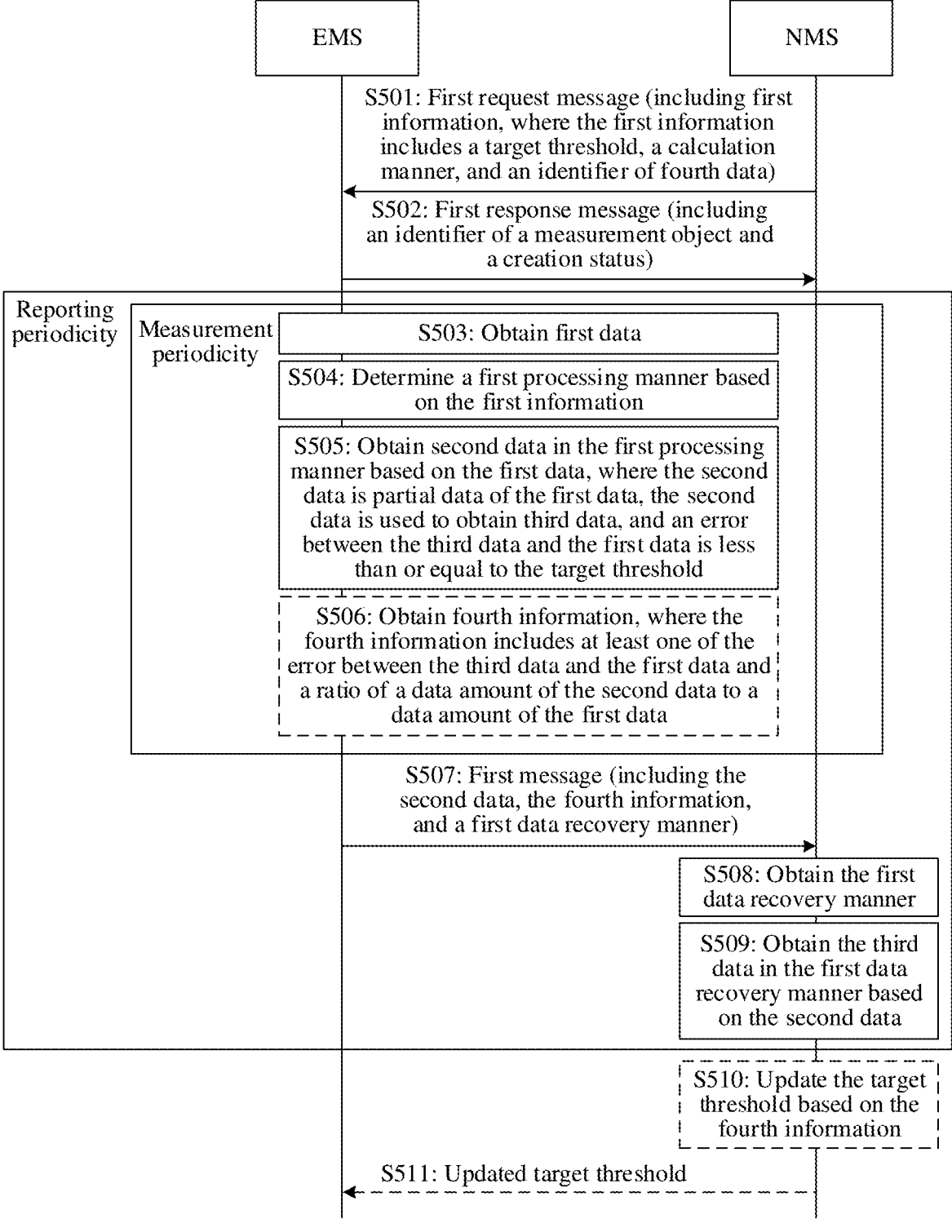
FIG. 5 is a schematic flowchart of a communication method according to an embodiment.

FIG. 5 is a schematic flowchart of a communication method according to an the embodiment. This embodiment relates to a measurement task control service scenario. A first communication apparatus may be an EMS or a component (such as a chip or a chip system) of the EMS, and a second communication apparatus may be an NMS or a component (such as a chip or a chip system) of the NMS; a first communication apparatus may be a RAN or a component (such as a chip or a chip system) of the RAN, and a second communication apparatus may be an NMS or a component (such as a chip or a chip system) of the NMS; or a first communication apparatus may be a RAN (such as a chip or a chip system), and a second communication apparatus may be an EMS or a component (such as a chip or a chip system) of the EMS. FIG. 5 is described by using an example in which the first communication apparatus is the EMS and the second communication apparatus is the NMS. A dashed line in FIG. 5 indicates that the step is an optional step, in other words, the step may be performed or may not be performed.

In this embodiment, the first communication apparatus does not send an identifier of one or more processing manners supported by the first communication apparatus to the second communication apparatus, and the second communication apparatus determines a first data recovery manner in a first recovery processing manner that is from the first communication apparatus. As shown in FIG. 5, the procedure may include the following content.

S501: The NMS sends a first request message to the EMS; and correspondingly, the EMS receives the first request message.

The first request message is used to request to obtain first data. In this embodiment, the first request message may be a measurement task creation request message. However, the embodiments are not limited thereto. The first request message may include first information, and the first information includes one or more of a target threshold, a calculation manner, and an identifier of fourth data. Optionally, the first request message may further include one or more of an identifier of a measurement object, a type of network measurement data, a reporting manner, a measurement periodicity, and a reporting periodicity. For an implementation of step S501, refer to related descriptions in the foregoing step S401 and step S402. Details are not described herein again.

S502: The EMS sends a first response message to the NMS; and correspondingly, the NMS receives the first response message.

In this embodiment, the first response message may include an identifier of a measurement object and a creation status (for example, a creation success, a creation failure, or a partial creation success). When the creation fails or the creation partially succeeds, the first response message may further include one or more of a type of measurement parameter in the creation failure and a cause of the creation failure, as shown in Table 1. FIG. 5 shows an example in which task creation succeeds.

S503: The EMS obtains the first data.

For example, the EMS may collect network measurement data of the measurement object based on the identifier of the measurement object, the measurement periodicity, the type of network measurement data, and the identifier of the fourth data, to obtain the first data.

S504: The EMS determines a first processing manner based on the first information.

In this embodiment, the EMS may determine the first processing manner based on the first information. For example, the EMS supports the one or more processing manners, and the EMS may determine, from a plurality of processing manners based on the calculation manner, a processing manner corresponding to a minimum error between third data and the first data as the first processing manner; determine, from the plurality of processing manners based on the calculation manner, a processing manner corresponding to the highest accuracy of third data as the first processing manner; or determine, from the plurality of manners based on the target threshold, a processing manner in which the target threshold is met as the first processing manner. This is not limited in the embodiments.

S505: The EMS obtains second data in the first processing manner based on the first data.

The second data is partial data of the first data. The second data may be used to obtain the third data. The error between the third data and the first data is less than or equal to the target threshold. The first processing manner is used to obtain, from original data, partial data of the original data, so that a data amount of to-be-transmitted data can be reduced. The first processing manner may be, for example, a compression algorithm based on column subspace padding, or a compression algorithm based on matrix padding. This is not limited in the embodiments.

S506: The EMS obtains fourth information.

Step S506 is an optional step. The fourth information may include the error between the third data and the first data (or the accuracy of the third data), include a ratio of a data amount of the second data to a data amount of the first data, or include the error between the third data and the first data and a ratio of a data amount of the second data to a data amount of the first data. For example, after obtaining the second data, the EMS may calculate the error between the third data and the first data (or calculate the accuracy of the third data that is obtained by processing the second data in the first data recovery manner), and calculate the ratio of the data amount of the second data to the data amount of the first data, to obtain the fourth information.

S507: The EMS sends a first message to the NMS; and correspondingly, the NMS receives the first message.

The first message includes the second data, second information, and the fourth information. In this embodiment, the second information includes the first data recovery manner (for example, a calculation formula of the first data recovery manner or a name of the first data recovery manner). Optionally, the second information may further include a data recovery identifier. The data recovery identifier identifies a location of the second data in the first data. For example, the first processing manner is a compression algorithm based on a column subspace, and the data recovery identifier may be a column identifier of a column subspace of the first data and a location index of the second data in the first data. The second data, the second information, and the fourth information may be carried in a same message or may be carried in different messages. In FIG. 5, an example in which the second data, the second information, and the fourth information are carried in the same message is used.

S508: The NMS obtains the first data recovery manner.

In this embodiment, the second information includes the first data recovery manner. After receiving the first message, the NMS parses the first message to obtain the first data recovery manner.

S509: The NMS obtains the third data in the first data recovery manner based on the second data.

For example, the NMS may process the second data in the first data recovery manner, to obtain the third data. For example, the NMS may process the second data based on the data recovery identifier in the first data recovery manner, to obtain the third data.

S510: The NMS updates the target threshold based on the fourth information.

Step S510 is an optional step. For example, the NMS may update the target threshold based on fourth information in one or more measurement periodicities. For example, if the accuracy of the third data is greater than a target accuracy threshold in a plurality of consecutive measurement periodicities, the NMS may adaptively increase the target accuracy threshold based on the ratio of the data amount of the second data to the data amount of the first data. For another example, if the error between the third data and the first data is greater than a target error threshold in a plurality of consecutive measurement periodicities, the NMS may adaptively decrease the target error threshold based on the ratio of the data amount of the second data to the data amount of the first data.

S511: The NMS sends an updated target threshold to the EMS; and correspondingly, the EMS receives the updated target threshold.

Step S511 is an optional step. The NMS may send the updated target threshold to the EMS, so that the EMS may determine the first processing manner and the like based on the updated target threshold.

In the foregoing embodiment, the EMS collects the first data, and sends the partial data of the first data to the NMS, so that overheads of transmission resources between the EMS and the NMS can be reduced, a measurement periodicity at a second-level granularity, a millisecond-level granularity, or a finer granularity is supported, and precision of the network measurement data can be improved. The EMS obtains the second data from the first data in the first processing manner and sends the first data recovery manner corresponding to the first processing manner to the NMS, so that the NMS can obtain the third data based on the second data. The error between the third data and the first data is less than or equal to the target threshold, so that accuracy of the network measurement data can be improved.

Figure 6:
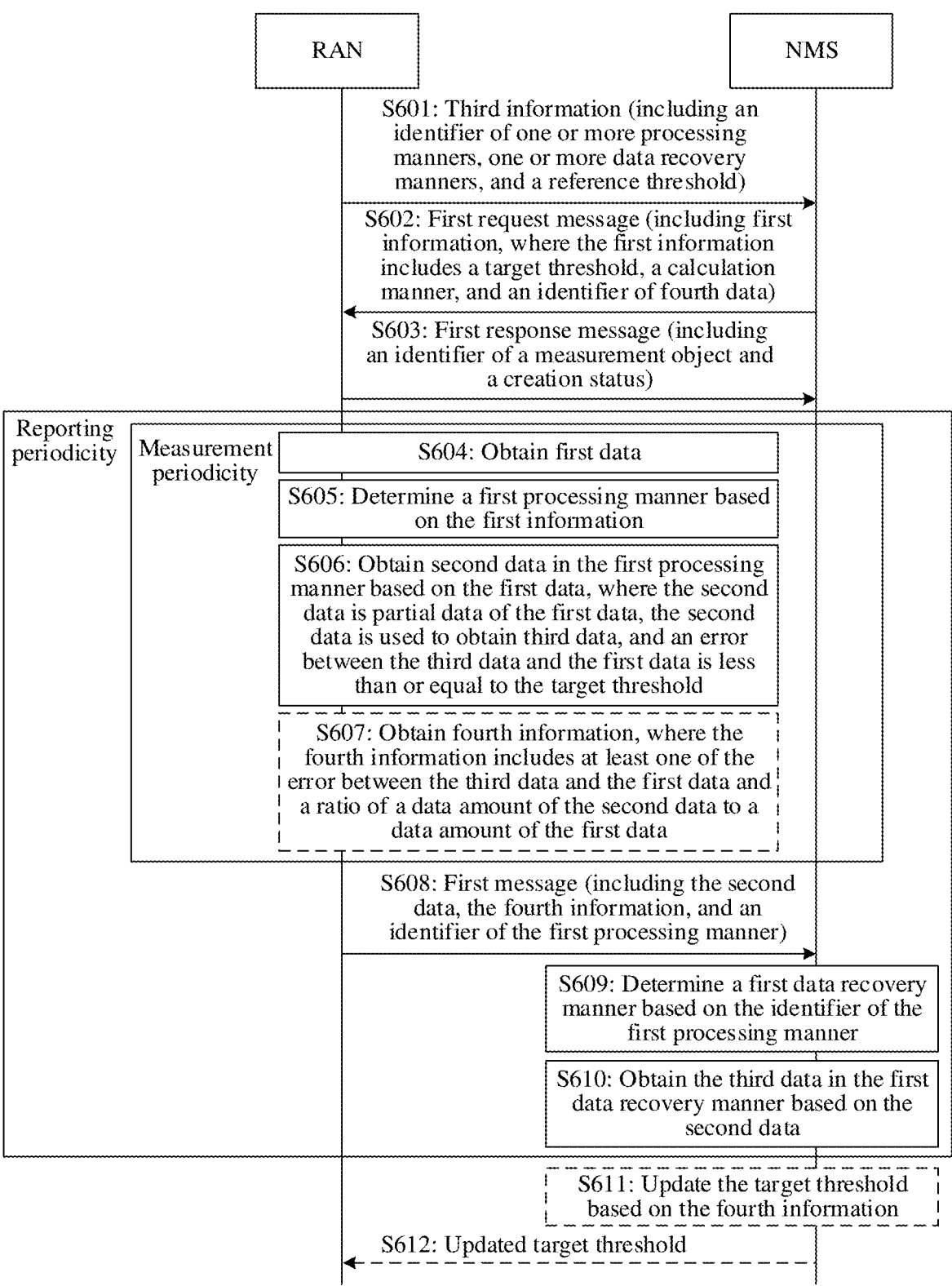
FIG. 6 is a schematic flowchart of a communication method according to an embodiment.

FIG. 6 is a schematic flowchart of a communication method according to an embodiment. This embodiment relates to a measurement task control service scenario. A first communication apparatus may be an EMS or a component (such as a chip or a chip system) of the EMS, and a second communication apparatus may be an NMS or a component (such as a chip or a chip system) of the NMS; a first communication apparatus may be a RAN or a component (such as a chip or a chip system) of the RAN, and a second communication apparatus may be an NMS or a component (such as a chip or a chip system) of the NMS; or a first communication apparatus may be a RAN (such as a chip or a chip system), and a second communication apparatus may be an EMS or a component (such as a chip or a chip system) of the EMS. FIG. 6 is described by using an example in which the first communication apparatus is the RAN and the second communication apparatus is the NMS. A dashed line in FIG. 6 indicates that the step is an optional step, in other words, the step may be performed or may not be performed.

In this embodiment, the first communication apparatus sends an identifier of one or more processing manners supported by the first communication apparatus to the second communication apparatus, and the second communication apparatus determines a first data recovery manner based on an identifier of a first processing manner that is from the first communication apparatus. Step S602 to step S607 and step S610 to step S612 are correspondingly the same as step S501 to step S506 and step S609 to step S611 in FIG. 5, and differences between the two figures are as follows.

S601: The RAN sends third information to the NMS; and correspondingly, the NMS receives the third information.

In this embodiment, the third information includes the identifier of the one or more processing manners supported by the RAN, includes one or more data recovery manners (for example, a calculation formula of the one or more data recovery manners or a name of the one or more data recovery manners), or includes the identifier of the one or more processing manners and one or more data recovery manners. The identifier of the one or more processing manners includes the identifier of the first processing manner. The one or more processing manners are in one-to-one correspondence with the one or more data recovery manners. For example, when a processing manner is a compression algorithm based on a column subspace, a data recovery manner corresponding to a processing manner may be a data reconstruction formula.

Optionally, the third information may further include a reference threshold. The reference threshold may be an error threshold, an accuracy threshold, or an error threshold and an accuracy threshold that are estimated by the RAN based on a reporting status of historical data. The reference threshold may be used as a reference for the NMS to determine a target threshold. In other words, the NMS may determine the target threshold, determine the first processing manner, or determine the target threshold and the first processing manner based on the reference threshold.

The RAN may actively send the third information to the NMS or may send the third information to the NMS in response to a second request message of the NMS. For example, the NMS sends the second request message to the RAN, where the second request message is used to request to obtain the identifier of the one or more processing manners supported by the RAN; and correspondingly, after receiving the second request message, the RAN may send a second response message to the NMS, where the second response message includes the third information.

S608: The RAN sends a first message to the NMS; and correspondingly, the NMS receives the first message.

The first message includes second data, second information, and fourth information. In this embodiment, the second information includes the identifier of the first processing manner. Optionally, the second information may further include a data recovery identifier. The data recovery identifier identifies a location of the second data in the first data. For example, the first processing manner is the compression algorithm based on the column subspace, and the data recovery identifier may be a column identifier of a column subspace of the first data and a location index of the second data in the first data. The second data, the second information, and the fourth information may be carried in a same message or may be carried in different messages. In FIG. 6, an example in which the second data, the second information, and the fourth information are carried in the same message is used.

S609: The NMS determines the first data recovery manner based on the identifier of the first processing manner.

For example, the NMS obtains the identifier of the first processing manner based on the first message, and then determines the first data recovery manner based on the identifier of the first processing manner and a correspondence between the first processing manner and the first data recovery manner.

In the foregoing embodiment, the RAN collects the first data, and sends the partial data of the first data to the NMS, so that overheads of transmission resources between the RAN and the NMS can be reduced, a measurement periodicity at a second-level granularity, a millisecond-level granularity, or a finer granularity is supported, and precision of network measurement data can be improved. The RAN supports reporting, to the NMS, the one or more processing manners and/or the one or more data recovery manners supported by the RAN. In this way, the NMS may determine a proper target threshold based on a data processing capability of the RAN, a requirement of the NMS for accuracy, a bandwidth resource allocation status of the NMS, and the like. Further, the RAN obtains the second data from the first data in the first processing manner, and sends the identifier of the first processing manner to the NMS, so that the NMS can determine the first data recovery manner based on the identifier of the first processing manner and the correspondence between the first processing manner and the first data recovery manner, and obtain third data in the first data recovery manner based on the second data. An error between the third data and the first data is less than or equal to the target threshold, so that accuracy of the network measurement data can be improved.

Figure 7:
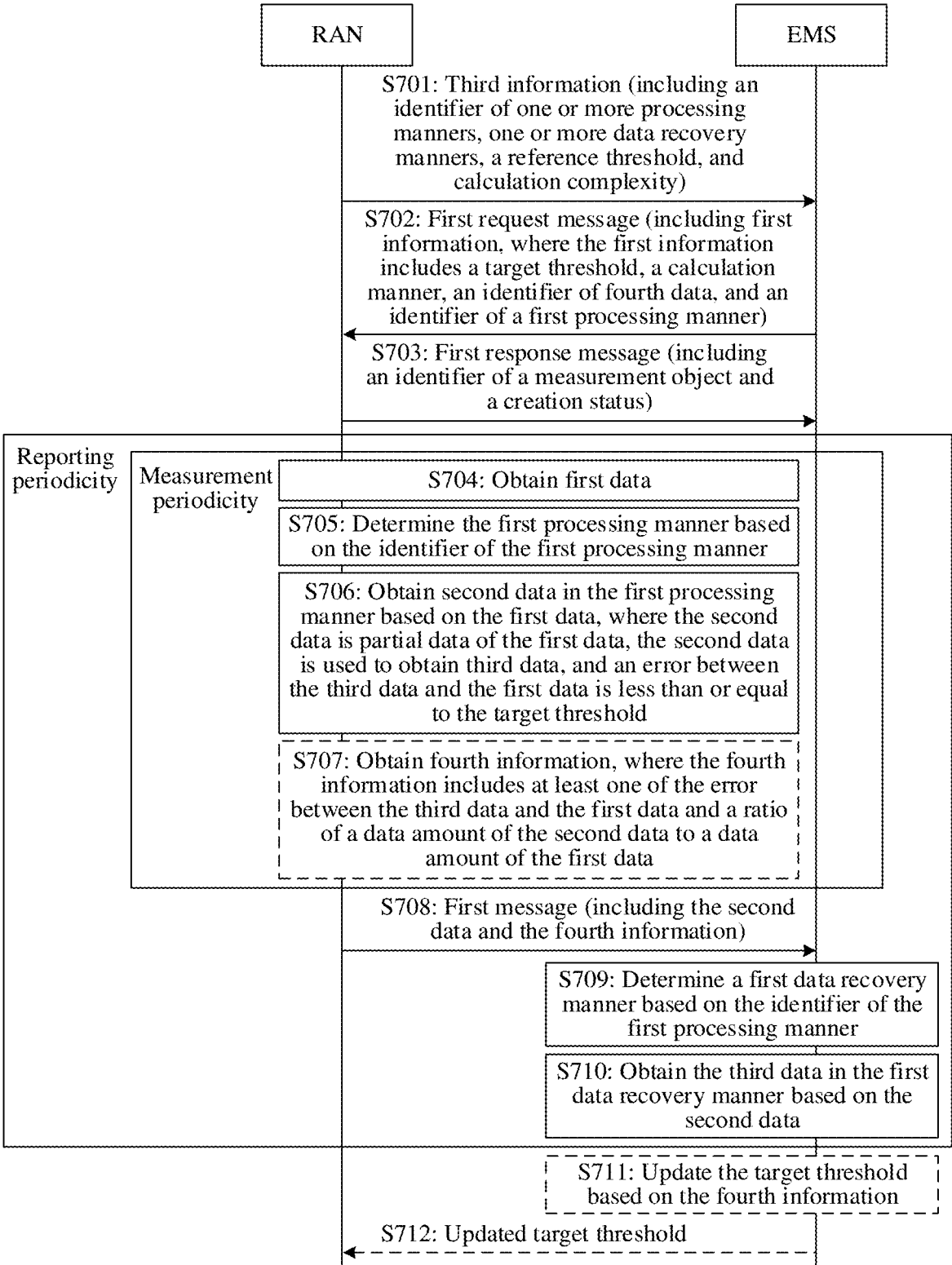
FIG. 7 is a schematic flowchart of a communication method according to an embodiment.

FIG. 7 is a schematic flowchart of a communication method according to an embodiment. This embodiment relates to a measurement task control service scenario. A first communication apparatus may be an EMS or a component (such as a chip or a chip system) of the EMS, and a second communication apparatus may be an NMS or a component (such as a chip or a chip system) of the NMS; a first communication apparatus may be a RAN or a component (such as a chip or a chip system) of the RAN, and a second communication apparatus may be an NMS or a component (such as a chip or a chip system) of the NMS; or a first communication apparatus may be a RAN (such as a chip or a chip system), and a second communication apparatus may be an EMS or a component (such as a chip or a chip system) of the EMS. FIG. 7 is described by using an example in which the first communication apparatus is the RAN and the second communication apparatus is the EMS. A dashed line in FIG. 7 indicates that the step is an optional step, in other words, the step may be performed or may not be performed.

In this embodiment, the first communication apparatus sends an identifier of one or more processing manners supported by the first communication apparatus to the second communication apparatus, and the second communication apparatus sends an identifier of a first processing manner to the first communication apparatus. Step S703 and step S704, step S706 and step S707, and step S709 to step S712 are correspondingly the same as step S603 and step S604, step S606 and step S607, and step S609 to step S612 in FIG. 6, and differences between the two figures are as follows.

S701: The RAN sends third information to the EMS; and correspondingly, the NMS receives the third information.

In this embodiment, the third information includes the identifier of the one or more processing manners supported by the RAN, includes one or more data recovery manners (for example, a calculation formula of the one or more data recovery manners or a name of the one or more data recovery manners) supported by the RAN, or includes an identifier of one or more processing manners and one or more data recovery manners that are supported by the RAN.

Optionally, the third information may further include a reference threshold and calculation complexity of the one or more data recovery manners. The identifier of the one or more processing manners includes the identifier of the first processing manner. The one or more processing manners are in one-to-one correspondence with the one or more data recovery manners. For example, when a processing manner is a compression algorithm based on a column subspace, a data recovery manner corresponding to the processing manner may be a data reconstruction formula.

The reference threshold may be an error threshold, an accuracy threshold, or an error threshold and an accuracy threshold that are estimated by the RAN based on at least one of a reporting status of historical data and a processing capability of the RAN. In this embodiment, the reference threshold may be used as a reference for determining a target threshold and/or the first processing manner by the EMS. For example, the EMS may determine the target threshold, determine the first processing manner, or determine the target threshold and the first processing manner based on the reference threshold.

The calculation complexity of the one or more data recovery manners may be used to determine the target threshold (where for example, the target threshold is adaptively adjusted based on the calculation complexity and a data processing capability of the EMS), used to determine the first processing manner (for example, determine a processing manner corresponding to a data recovery manner with a minimum calculation complexity as the first processing manner), or used to determine the target threshold and the first processing manner.

The RAN may actively send the third information to the NMS or may send the third information to the NMS in response to a second request message of the NMS. For an implementation process, refer to related descriptions of the foregoing step S601. Details are not described herein again.

S702: The EMS sends a first request message to the RAN; and correspondingly, the RAN receives the first request message.

The first request message is used to request to obtain first data. In this embodiment, the first request message may include first information, and the first information includes the target threshold, a calculation manner, an identifier of fourth data, and the identifier of the first processing manner. Optionally, the first request message may further include one or more of an identifier of a measurement object, a type of network measurement data, a reporting manner, a measurement periodicity, and a reporting periodicity. For example, the EMS may determine the target threshold based on one or more of the reference threshold, the one or more processing manners supported by the RAN, the calculation complexity of the one or more data recovery manners, a bandwidth resource allocation status of the EMS, a requirement of the EMS, and the data processing capability of the EMS. For another example, the EMS may determine the first processing manner based on one or more of the reference threshold, the one or more processing manners supported by the RAN, the calculation complexity of the one or more data recovery manners, a bandwidth resource allocation status of the EMS, a requirement of the EMS, and the data processing capability of the EMS. For still another example, the EMS may determine the target threshold and the first processing manner based on one or more of the reference threshold, the one or more processing manners supported by the RAN, the calculation complexity of the one or more data recovery manners, a bandwidth resource allocation status of the EMS, a requirement of the EMS, and the data processing capability of the EMS.

S705: The RAN determines the first processing manner based on the identifier of the first processing manner.

For example, the RAN may obtain the identifier of the first processing manner based on the first information, for example, parse the first information to obtain the identifier of the first processing manner. Further, the RAN may determine the first processing manner based on the identifier of the first processing manner.

S708: The RAN sends a first message to the EMS; and correspondingly, the EMS receives the first message.

In this embodiment, the first message includes second data and fourth information. Optionally, the first message may further include a data recovery identifier. The data recovery identifier identifies a location of the second data in the first data. For example, the first processing manner is the compression algorithm based on the column subspace, and the data recovery identifier may be a column identifier of a column subspace of the first data and a location index of the second data in the first data.

In the foregoing embodiment, the RAN collects the first data, and sends the partial data of the first data to the EMS, so that overheads of transmission resources between the RAN and the EMS can be reduced, a measurement periodicity at a second-level granularity, a millisecond-level granularity, or a finer granularity is supported, and precision of the network measurement data can be improved. The RAN supports reporting, to the EMS, the one or more processing manners and/or the one or more data recovery manners supported by the RAN. In this way, the EMS may determine a proper target threshold based on the data processing capability of the RAN, a requirement of the EMS for accuracy, the data processing capability of the EMS, and the like. Further, the EMS supports indicating the first processing manner to the RAN, for example, sends the identifier of the first processing manner to the RAN. Correspondingly, the RAN may obtain the second data from the first data in the first processing manner. The second data may be used to obtain third data, and an error between the third data and the first data is less than or equal to the target threshold. The EMS may specify the first processing manner. For example, the first processing manner is determined based on the requirement of the EMS, an actual situation of the EMS, and the like. In this case, the second data that is obtained in the first processing manner and the third data that is determined based on the second data can meet the requirement of the EMS and meet the actual situation of the EMS.

The foregoing FIG. 5 to FIG. 7 describe a measurement task control service procedure between a pair of a measurement task control service producer and a measurement task control service consumer. The following describes a measurement task control service procedure between two pairs of measurement task control service producers and measurement task control service consumers with reference to FIG. 8 to FIG. 10.

Figure 8:
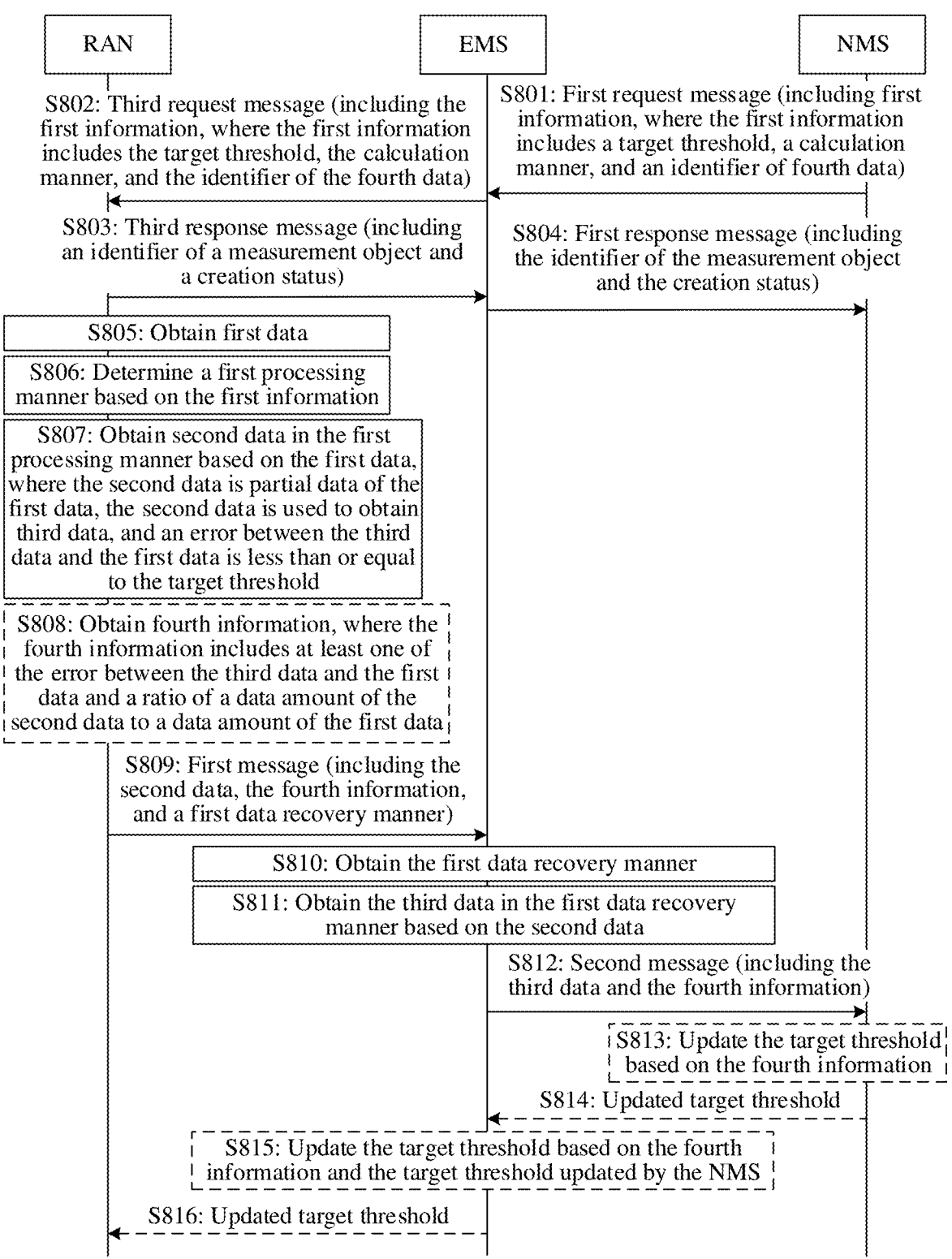
FIG. 8 is still another schematic flowchart of a communication method according to an embodiment.

FIG. 8 is still another schematic flowchart of a communication method according to an embodiment. This embodiment relates to a measurement task control service scenario, and to two pairs of measurement task control service producers and measurement task control service consumers. A dashed line in FIG. 8 indicates that the step is an optional step, in other words, the step may be performed or may not be performed.

In this embodiment, a RAN does not send an identifier of one or more processing manners supported by the RAN to an EMS and an NMS, and the EMS determines, in a first recovery processing manner from the RAN, a first data recovery manner. As shown in FIG. 8, the procedure may include the following content.

S801: The NMS sends a first request message to the EMS; and correspondingly, the EMS receives the first request message.

The first request message is used to request to obtain first data. In this embodiment, the first request message may be a measurement task creation request message. However, the embodiments are not limited thereto. The first request message may include first information, and the first information includes one or more of a target threshold, a calculation manner, and an identifier of fourth data. Optionally, the first request message may further include one or more of an identifier of a measurement object, a type of network measurement data, a reporting manner, a measurement periodicity, and a reporting periodicity. For an implementation of step S801, refer to related descriptions in the foregoing step S401 and step S402. Details are not described herein again.

S802: The EMS sends a third request message to the RAN; and correspondingly, the RAN receives the third request message.

After receiving the first request message, the EMS may send the third request message to the RAN to which the measurement object belongs. In this embodiment, the third request message may be the measurement task creation request message. However, the embodiments are not limited thereto. The third request message may include the first information, and the first information includes one or more of the target threshold, the calculation manner, and the identifier of the fourth data. Optionally, the third request message may further include one or more of the identifier of the measurement object, the type of network measurement data, the reporting manner, the measurement periodicity, and the reporting periodicity.

It should be noted that, content included in the first request message may be the same as or different from content included in the third request message. For example, the first request message is used to request to obtain network measurement data of a measurement object A and network measurement data of a measurement object B. The third request message may be used to request to obtain network measurement data of the measurement object A. For example, the EMS stores the network measurement data of the measurement object B. Alternatively, the third request message may be used to request to obtain the network measurement data of the measurement object A, the network measurement data of the measurement object B, and network measurement data of a measurement object C. For example, the network measurement data of the measurement object C is network measurement data needed by the EMS. For ease of understanding, an example in which content included in the first request message is the same as content included in the third request message is used for description below.

S803: The RAN sends a third response message to the EMS; and correspondingly, the EMS receives the third response message.

S804: The EMS sends a first response message to the NMS; and correspondingly, the NMS receives the first response message.

For implementation processes of step S803 and step S804, refer to related descriptions of step S502. Details are not described herein again.

S805: The RAN obtains the first data.

For example, the RAN may collect network measurement data of the measurement object based on the identifier of the measurement object, the measurement periodicity, the type of network measurement data, and the identifier of the fourth data, to obtain the first data.

S806: The RAN determines a first processing manner based on the first information.

In this embodiment, the RAN may determine the first processing manner based on the first information. For example, the RAN supports the one or more processing manners, and the RAN may determine, from the plurality of processing manners based on the calculation manner, a processing manner corresponding to a minimum error between third data and the first data as the first processing manner; determine, from the plurality of processing manners based on the calculation manner, a processing manner corresponding to the highest accuracy of third data as the first processing manner; or determine, from the plurality of manners based on the target threshold, a processing manner in which the target threshold is met as the first processing manner. This is not limited in the embodiments.

S807: The RAN obtains second data in the first processing manner based on the first data.

The second data is partial data of the first data. The second data may be used to obtain the third data. The error between the third data and the first data is less than or equal to the target threshold. The first processing manner is used to obtain, from original data, partial data of the original data, so that a data amount of to-be-transmitted data can be reduced. The first processing manner may be, for example, a compression algorithm based on column subspace padding, or a compression algorithm based on matrix padding. This is not limited in the embodiments.

S808: The RAN obtains fourth information.

Step S808 is an optional step. The fourth information may include the error between the third data and the first data (or the accuracy of the third data), include a ratio of a data amount of the second data to a data amount of the first data, or include the error between the third data and the first data and a ratio of a data amount of the second data to a data amount of the first data. For example, after obtaining the second data, the RAN may calculate the error between the third data and the first data (or calculate the accuracy of the third data that is obtained by processing the second data in the first data recovery manner), and calculate the ratio of the data amount of the second data to the data amount of the first data, to obtain the fourth information.

S809: The RAN sends a first message to the EMS; and correspondingly, the EMS receives the first message.

The first message includes the second data, second information, and the fourth information. In this embodiment, the second information includes the first data recovery manner (for example, a calculation formula of the first data recovery manner or a name of the first data recovery manner). Optionally, the second information may further include a data recovery identifier. The data recovery identifier identifies a location of the second data in the first data. For example, the first processing manner is a compression algorithm based on a column subspace, and the data recovery identifier may be a column identifier of a column subspace of the first data and a location index of the second data in the first data.

S810: The EMS obtains the first data recovery manner.

In this embodiment, the second information includes the first data recovery manner. After receiving the first message, the EMS parses the first message to obtain the first data recovery manner.

S811: The EMS obtains the third data in the first data recovery manner based on the second data.

For example, the EMS may process the second data in the first data recovery manner, to obtain the third data. For example, the EMS may process the second data in the first data recovery manner based on the data recovery identifier, to obtain the third data.

S812: The EMS sends a second message to the NMS; and correspondingly, the NMS receives the second message.

In this embodiment, the second message includes the third data. Optionally, the second message may further include the fourth information.

S813: The NMS updates the target threshold based on the fourth information.

Step S813 is an optional step. For an implementation process of step S813, refer to related descriptions of the foregoing step S510. Details are not described herein again.

S814: The NMS sends an updated target threshold to the EMS; and correspondingly, the EMS receives the target threshold updated by the NMS.

Step S814 is an optional step. The NMS may send the updated target threshold to the EMS.

S815: The EMS updates the target threshold based on the target threshold updated by the NMS and the fourth information.

Step S815 is an optional step. After receiving the target threshold updated by the NMS, the EMS may send the target threshold updated by the NMS to the RAN or update the target threshold based on the target threshold updated by the NMS and the fourth information. For example, the EMS may update the target threshold based on one or more of the target threshold updated by the NMS, the fourth information, a bandwidth resource usage situation of the EMS, and the like, so that the updated target threshold conforms to an actual situation of the EMS.

S816: The EMS sends the updated target threshold to the RAN; and correspondingly, the RAN receives the updated target threshold.

Step S816 is an optional step. After receiving the updated target threshold, the RAN may determine the first processing manner and the like based on the updated target threshold.

The foregoing embodiment relates to two pairs of measurement task control service producers and measurement task control service consumers. The RAN collects the first data and sends partial data of the first data to the EMS, so that overheads of transmission resources between the RAN and the EMS can be reduced, a measurement periodicity at a second-level granularity, a millisecond-level granularity, or a finer granularity is supported, and precision of the network measurement data can be improved. After obtaining the third data, the EMS may report the full third data, to reduce a quantity of times of data compression, reduce a delay, and improve accuracy of the network measurement data. In addition, in this embodiment, the RAN supports sending a first data recovery manner corresponding to the first processing manner to the EMS, so that the EMS obtains the third data based on the second data and the first data recovery manner.

Figure 9:
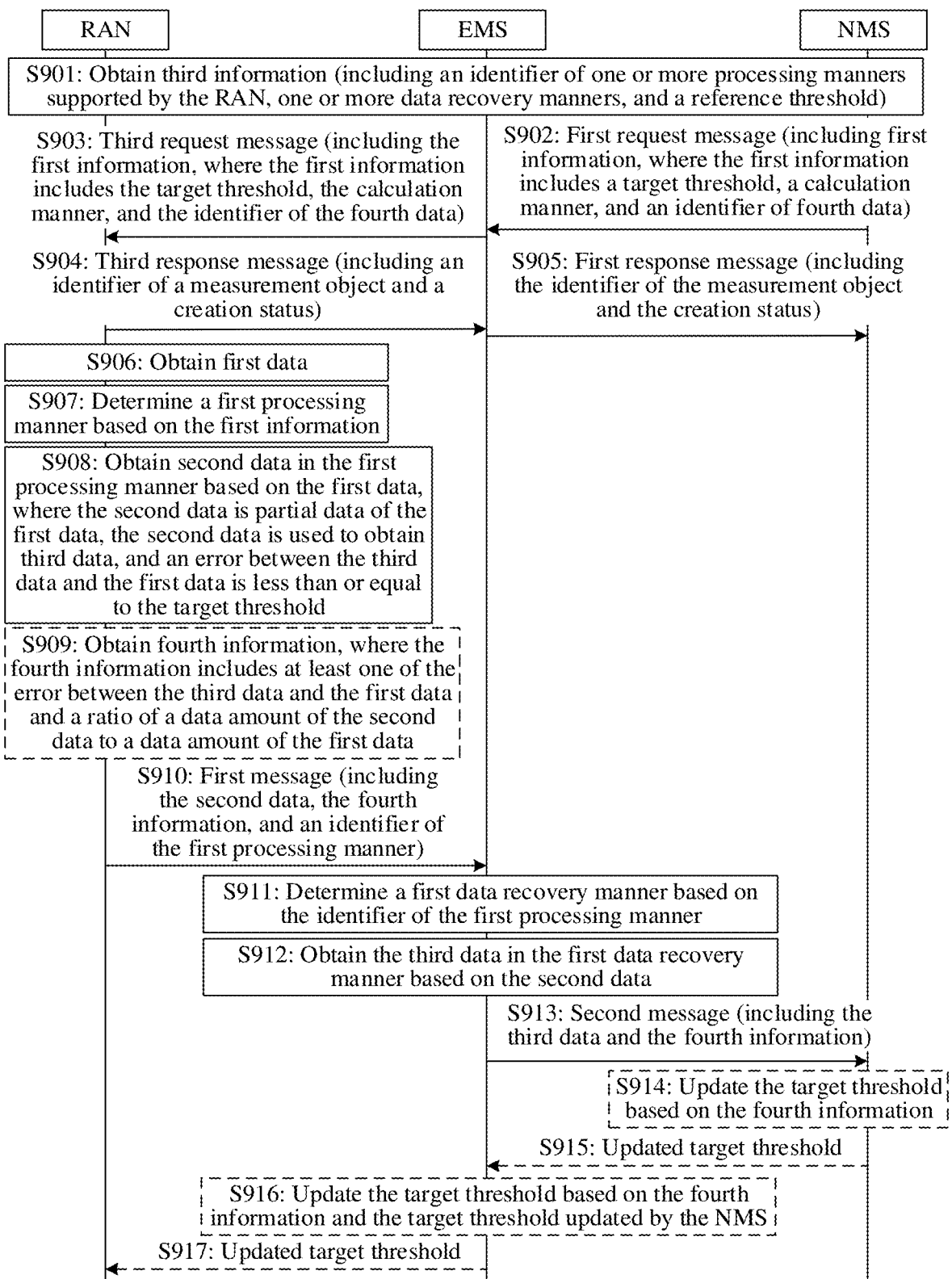
FIG. 9 is still another schematic flowchart of a communication method according to an embodiment.

FIG. 9 is still another schematic flowchart of a communication method according to an embodiment. This embodiment relates to a measurement task control service scenario, and to two pairs of measurement task control service producers and measurement task control service consumers. A dashed line in FIG. 9 indicates that the step is an optional step, in other words, the step may be performed or may not be performed.

In this embodiment, a RAN sends an identifier of one or more processing manners supported by the RAN to an EMS and an NMS, and the EMS determines a first data recovery manner based on an identifier of a first processing manner from the RAN. Step S902 to step S909 and step S912 to step S917 are correspondingly the same as step S801 to step S808 and step S811 to step S816 in FIG. 8, and differences between the two figures are as follows.

S901: The EMS and the NMS obtain third information.

The EMS may obtain the third information, the NMS may obtain the third information, or the EMS and the NMS may obtain the third information. For example, the RAN reports the third information to the EMS, the RAN reports the third information to the NMS, or the RAN reports the third information to the EMS and the NMS. In the embodiments, an example in which the EMS and the NMS obtain the third information is used. In addition, for an implementation process in which the RAN sends the third information to the EMS and the NMS, refer to related descriptions of step S601. Details are not described herein again.

In this embodiment, the third information includes an identifier of one or more processing manners and one or more data recovery manners (for example, a calculation formula of the one or more data recovery manners or a name of the one or more data recovery manners) that are supported by the RAN. The identifier of the one or more processing manners includes the identifier of the first processing manner. The one or more processing manners are in one-to-one correspondence with the one or more data recovery manners. For example, when the processing manner is a compression algorithm based on a column subspace, the data recovery manner corresponding to the processing manner may be a data reconstruction formula.

Optionally, the third information may further include a reference threshold. The reference threshold may be an error threshold, an accuracy threshold, or an error threshold and an accuracy threshold that are estimated by the RAN based on a reporting status of historical data and a data processing capability of the RAN. The reference threshold may be used as a reference for the NMS (and/or the EMS) to determine a target threshold. In other words, the NMS (and/or the EMS) may determine the target threshold, determine the first processing manner, or determine the target threshold and the first processing manner based on the reference threshold.

S910: The RAN sends a first message to the EMS; and correspondingly, the EMS receives the first message.

The first message includes second data, second information, and fourth information. In this embodiment, the second information includes the identifier of the first processing manner. Optionally, the second information may further include a data recovery identifier. The data recovery identifier identifies a location of the second data in the first data. For example, the first processing manner is a compression algorithm based on a column subspace, and the data recovery identifier may be a column identifier of a column subspace of the first data and a location index of the second data in the first data.

S911: The EMS determines the first data recovery manner based on the identifier of the first processing manner.

For example, the EMS obtains the identifier of the first processing manner based on the first message, and then determines the first data recovery manner based on the identifier of the first processing manner and a correspondence between the first processing manner and the first data recovery manner.

The foregoing embodiment relates to two pairs of measurement task control service producers and measurement task control service consumers. The RAN collects the first data and sends partial data of the first data to the EMS, so that overheads of transmission resources between the RAN and the EMS can be reduced, a measurement periodicity at a second-level granularity, a millisecond-level granularity, or a finer granularity is supported, and precision of network measurement data can be improved. After obtaining the third data, the EMS may report the full third data, to reduce a quantity of times of data compression, reduce a delay, and improve accuracy of the network measurement data. In addition, in this embodiment, the RAN supports sending the one or more processing manners and/or the one or more data recovery manners supported by the RAN to the EMS and the NMS. In this way, the NMS may determine a proper target threshold based on a data processing capability of the RAN, a requirement of the NMS for accuracy, a bandwidth resource allocation status of the NMS, and the like. In addition, the RAN may send the identifier of the first processing manner to the EMS, so that the EMS determines the first data recovery manner based on the identifier of the first processing manner and obtains the third data based on the second data and the first data recovery manner.

Figure 10:
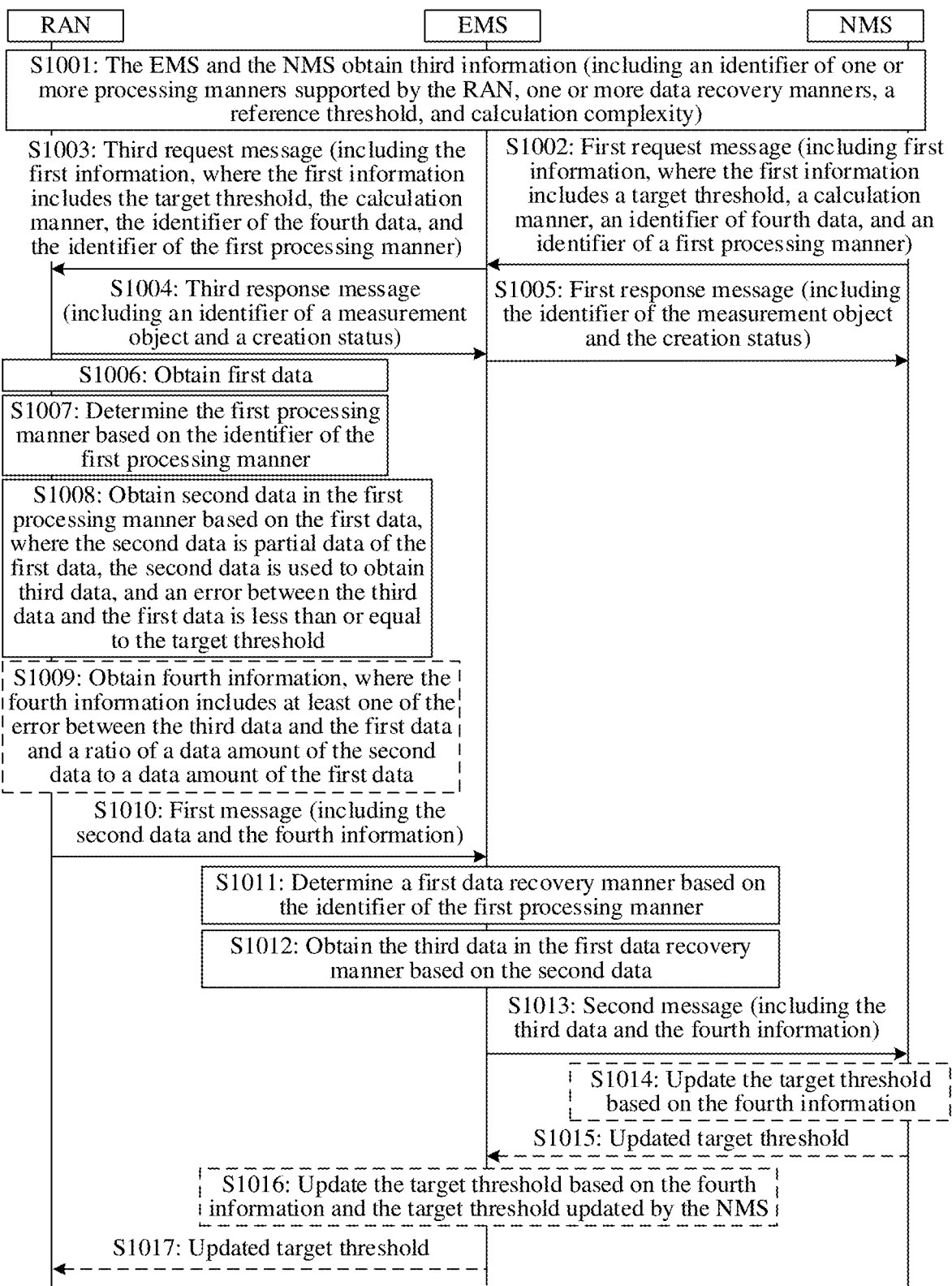
FIG. 10 is still another schematic flowchart of a communication method according to an embodiment.

FIG. 10 is still another schematic flowchart of a communication method according to an embodiment. This embodiment relates to a measurement task control service scenario, and to two pairs of measurement task control service producers and measurement task control service consumers. A dashed line in FIG. 10 indicates that the step is an optional step, in other words, the step may be performed or may not be performed.

In this embodiment, a RAN sends an identifier of one or more processing manners supported by the RAN to an EMS and an NMS, and the EMS sends an identifier of a first processing manner to the RAN. Step S1004 to step S1006, step S1008 and step S1009 and step S1011 to step S1017 are correspondingly the same as step S904 to step S906, step S908 and step S909, and step S911 to step S917 in FIG. 9, and differences between the two figures are as follows.

S1001: The EMS and the NMS obtain third information.

The EMS may obtain the third information, the NMS may obtain the third information, or the EMS and the NMS may obtain the third information. For example, the RAN reports the third information to the EMS, the RAN reports the third information to the NMS, or the RAN reports the third information to the EMS and the NMS. In the embodiments, an example in which the EMS and the NMS obtain the third information is used. In addition, for an implementation process in which the RAN sends the third information to the EMS and the NMS, refer to related descriptions of step S601. Details are not described herein again.

In this embodiment, the third information includes an identifier of one or more processing manners supported by the RAN, includes one or more data recovery manners (for example, a calculation formula of the one or more data recovery manners or a name of the one or more data recovery manners) supported by the RAN, or includes an identifier of one or more processing manners and one or more data recovery manners that are supported by the RAN. The identifier of the one or more processing manners includes the identifier of the first processing manner. The one or more processing manners are in one-to-one correspondence with the one or more data recovery manners. For example, when the processing manner is a compression algorithm based on a column subspace, the data recovery manner corresponding to the processing manner may be a data reconstruction formula. Optionally, the third information may further include a reference threshold and calculation complexity of the one or more data recovery manners. For related descriptions of the reference threshold and the calculation complexity, refer to related content in step S701. Details are not described herein again.

S1002: The NMS sends a first request message to the EMS; and correspondingly, the EMS receives the first request message.

The first request message is used to request to obtain first data. In this embodiment, the first request message may include first information, and the first information includes a target threshold, a calculation manner, an identifier of fourth data, and the identifier of the first processing manner.

S1003: The EMS sends a third request message to the NMS; and correspondingly, the RSN receives the third request message.

The third request message is used to request to obtain the first data. In this embodiment, the third request message may include the first information, and the first information includes the target threshold, the calculation manner, the identifier of the fourth data, and the identifier of the first processing manner.

For implementation processes of step S1002 and step S1003, refer to related descriptions of step S702. Details are not described herein again.

S1007: The RAN determines the first processing manner based on the identifier of the first processing manner.

For example, the RAN may obtain the identifier of the first processing manner based on the first information, for example, parse the first information to obtain the identifier of the first processing manner. Further, the RAN may determine the first processing manner based on the identifier of the first processing manner.

S1010: The RAN sends a first message to the EMS; and correspondingly, the EMS receives the first message.

In this embodiment, the first message includes second data and fourth information. Optionally, the first message may further include a data recovery identifier. The data recovery identifier identifies a location of the second data in the first data. For example, the first processing manner is a compression algorithm based on a column subspace, and the data recovery identifier may be a column identifier of a column subspace of the first data and a location index of the second data in the first data.

The foregoing embodiment relates to two pairs of measurement task control service producers and measurement task control service consumers. The RAN collects the first data and sends partial data of the first data to the EMS, so that overheads of transmission resources between the RAN and the EMS can be reduced, a measurement periodicity at a second-level granularity, a millisecond-level granularity, or a finer granularity is supported, and precision of network measurement data can be improved. After obtaining the third data, the EMS may report the full third data, to reduce a quantity of times of data compression, reduce a delay, and improve accuracy of the network measurement data. In addition, in this embodiment, the RAN supports reporting the identifier of the one or more processing manners and/or the one or more data recovery manners supported by the RAN to the EMS and the NMS. In this way, the NMS may determine a proper target threshold based on a data processing capability of the RAN, a requirement of the NMS for accuracy, a data processing capability of the NMS, a bandwidth resource allocation status of the NMS, and the like. Further, the NMS supports indicating, through the EMS, the first processing manner to the RAN. Correspondingly, the RAN may obtain the second data from the first data in the first processing manner. The second data may be used to obtain third data, and an error between the third data and the first data is less than or equal to the target threshold. The NMS may specify the first processing manner. For example, the first processing manner is determined based on the requirement of the NMS, an actual situation of the NMS, and the like. In this case, the second data that is obtained in the first processing manner and the third data that is determined based on the second data can meet the requirement of the NMS and meet the actual situation of the NMS.

The foregoing FIG. 5 to FIG. 10 describe an implementation procedure of a measurement task control service scenario. The following describes an implementation procedure of a parameter value query service scenario with reference to FIG. 11, FIG. 12, and FIG. 13.

Figure 11:
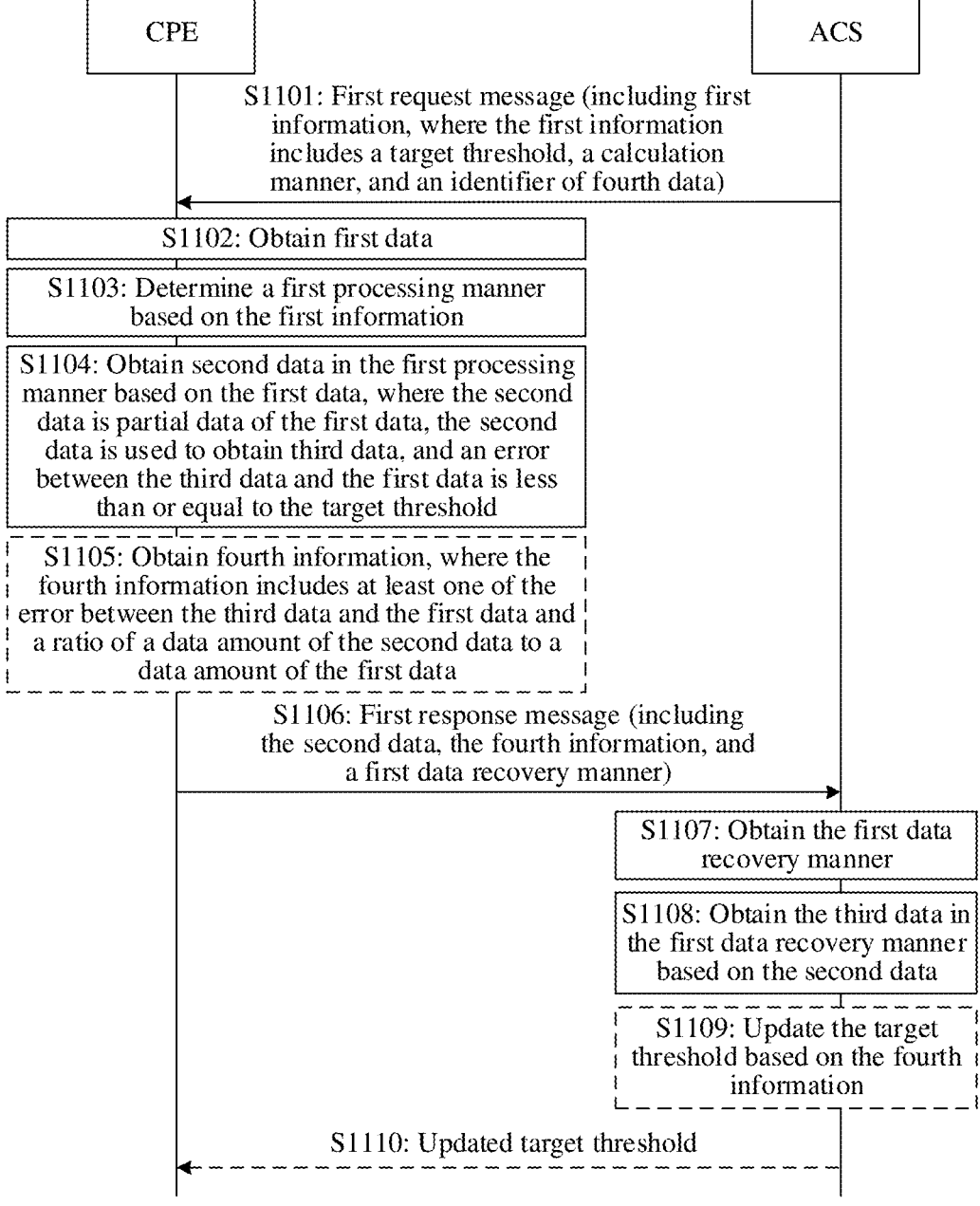
FIG. 11 is yet another schematic flowchart of a communication method according to an embodiment.

FIG. 11 is yet another schematic flowchart of a communication manner according to an embodiment. This embodiment relates to a parameter value query service scenario. A first communication apparatus may be a CPE or a component (such as a chip or a chip system) of the CPE, and a second communication apparatus may be an ACS or a component (such as a chip or a chip system) of the ACS. A dashed line in FIG. 11 indicates that the step is an optional step, in other words, the step may be performed or may not be performed.

In this embodiment, the first communication apparatus does not send an identifier of one or more processing manners supported by the first communication apparatus to the second communication apparatus, and the second communication apparatus determines a first data recovery manner in a first recovery processing manner that is from the first communication apparatus. As shown in FIG. 11, the procedure may include the following content.

S1101: The ACS sends a first request message to the CPE; and correspondingly, the CPE receives the first request message.

The first request message is used to request to obtain first data. In this embodiment, the first request message may be a parameter value query request message. However, the embodiments are not limited thereto. The first request message may include first information, and the first information includes one or more of a target threshold, a calculation manner, and an identifier of fourth data. Optionally, the first request message may further include a parameter name of a target parameter.

S1102: The CPE obtains the first data.

For example, the CPE may collect a parameter value of the target parameter based on the parameter name of the target parameter, to obtain the first data.

S1103: The CPE determines a first processing manner based on the first information.

In this embodiment, the CPE may determine the first processing manner based on the first information. For example, the CPE supports the one or more processing manners, and the CPE may determine, from the plurality of processing manners based on the calculation manner, a processing manner corresponding to a minimum error between third data and the first data as the first processing manner; determine, from the plurality of processing manners based on the calculation manner, a processing manner corresponding to the highest accuracy of third data as the first processing manner; or determine, from the plurality of manners based on the target threshold, a processing manner in which the target threshold is met as the first processing manner. This is not limited in the embodiments. The first processing manner may be, for example, a compression algorithm based on column subspace padding, or a compression algorithm based on matrix padding. This is not limited in the embodiments.

S1104: The CPE obtains second data in the first processing manner based on the first data.

The second data is partial data of the first data. The second data may be used to obtain the third data. The error between the third data and the first data is less than or equal to the target threshold. The first processing manner is used to obtain, from original data, partial data of the original data, so that a data amount of to-be-transmitted data can be reduced.

For an implementation process of step S1104, refer to related descriptions of the foregoing step S402. Details are not described herein again.

S1105: The CPE obtains fourth information.

Step S1105 is an optional step. The fourth information may include the error between the third data and the first data (or the accuracy of the third data), include a ratio of a data amount of the second data to a data amount of the first data, or include the error between the third data and the first data and a ratio of a data amount of the second data to a data amount of the first data. For example, after obtaining the second data, the CPE may calculate the error between the third data and the first data (or calculate the accuracy of the third data that is obtained by processing the second data in the first data recovery manner), and calculate the ratio of the data amount of the second data to the data amount of the first data, to obtain the fourth information.

S1106: The CPE sends a first response message to the ACS; and correspondingly, the ACS receives the first response message.

In this embodiment, the first response message may be a parameter value query response message. However, the embodiments are not limited thereto. The first response message may include the second data, second information, and the fourth information. In this embodiment, the second information includes the first data recovery manner (for example, a calculation formula of the first data recovery manner or a name of the first data recovery manner). Optionally, the second information may further include a data recovery identifier. The data recovery identifier identifies a location of the second data in the first data. For example, the first processing manner is a compression algorithm based on a column subspace, and the data recovery identifier may be a column identifier of a column subspace of the first data and a location index of the second data in the first data. The second data, the second information, and the fourth information may be carried in a same message or may be carried in different messages. In FIG. 11, an example in which the second data, the second information, and the fourth information are carried in the same message is used.

S1107: The ACS obtains the first data recovery manner.

In this embodiment, the second information includes the first data recovery manner. After receiving a first message, the ACS parses the first message to obtain the first data recovery manner.

S1108: The ACS obtains the third data in the first data recovery manner based on the second data.

For example, the ACS may process the second data in the first data recovery manner, to obtain the third data. For example, the ACS may process the second data in the first data recovery manner based on the data recovery identifier, to obtain the third data.

S1109: The ACS updates the target threshold based on the fourth information.

Step S1109 is an optional step. For example, the ACS may update the target threshold based on one or more pieces of fourth information. For example, if accuracy of a plurality of consecutive pieces of third data is greater than a target accuracy threshold, the ACS may adaptively increase the target accuracy threshold based on the ratio of the data amount of the second data to the data amount of the first data. For another example, if the error between the plurality of consecutive pieces of third data and the first data is greater than a target error threshold, the ACS may adaptively decrease the target error threshold based on the ratio of the data amount of the second data to the data amount of the first data.

S1110: The ACS sends an updated target threshold to the CPE; and correspondingly, the CPE receives the updated target threshold.

Step S1110 is an optional step. The ACS may send the updated target threshold to the CPE, so that the CPE may determine the first processing manner and the like based on the updated target threshold.

In the foregoing embodiment, the CPE collects the first data, and sends partial data of the first data to the ACS, so that overheads of transmission resources between the CPE and the ACS can be reduced, and utilization of network resources can be improved. The CPE obtains the second data from the first data in the first processing manner and sends a first data recovery manner corresponding to the first processing manner to the ACS, so that the ACS can obtain the third data based on the second data. The error between the third data and the first data is less than or equal to the target threshold, so that accuracy of a parameter value can be improved.

Figure 12:
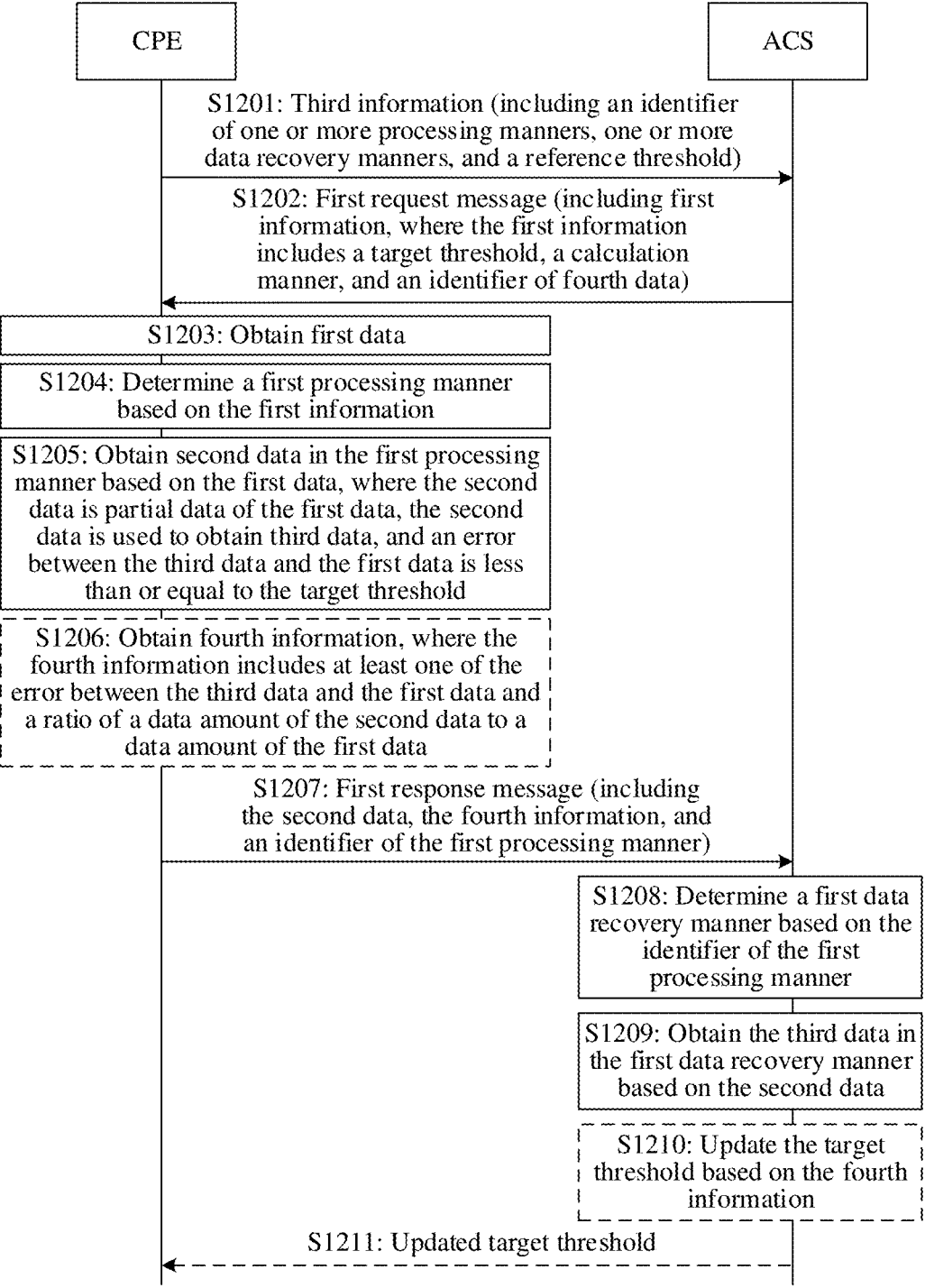
FIG. 12 is yet another schematic flowchart of a communication method according to an embodiment.

FIG. 12 is yet another schematic flowchart of a communication manner according to an embodiment. This embodiment relates to a parameter value query service scenario. A first communication apparatus may be a CPE or a component (such as a chip or a chip system) of the CPE, and a second communication apparatus may be an ACS or a component (such as a chip or a chip system) of the ACS. A dashed line in FIG. 12 indicates that the step is an optional step, in other words, the step may be performed or may not be performed.

In this embodiment, the first communication apparatus sends an identifier of one or more processing manners supported by the first communication apparatus to the second communication apparatus, and the second communication apparatus determines a first data recovery manner based on an identifier of a first processing manner that is from the first communication apparatus. Step S1202 to step S1206 and step S1209 to step S1211 are correspondingly the same as step S1101 to step S1105 and step S1108 to step S1110 in FIG. 11, and differences between the two figures are as follows.

S1201: The CPE sends third information to the ACS; and correspondingly, the ACS receives the third information.

In this embodiment, the third information includes an identifier of one or more processing manners supported by the CPE, includes one or more data recovery manners (for example, a calculation formula of the one or more data recovery manners or a name of the one or more data recovery manners) supported by the CPE, or includes an identifier of one or more processing manners and one or more data recovery manners that are supported by the CPE. The identifier of the one or more processing manners includes the identifier of the first processing manner. The one or more processing manners are in one-to-one correspondence with the one or more data recovery manners. For example, when the processing manner is a compression algorithm based on a column subspace, the data recovery manner corresponding to the processing manner may be a data reconstruction formula.

Optionally, the third information may further include a reference threshold. The reference threshold may be an error threshold, an accuracy threshold, or an error threshold and an accuracy threshold that are estimated by the CPE based on at least one of a reporting status of historical data and a data processing capability of the CPE. In this embodiment, the reference threshold may be used as a reference for determining a target threshold and/or the first processing manner by the ACS. In other words, the ACS may determine the target threshold, determine the first processing manner, or determine the target threshold and the first processing manner based on the reference threshold.

The CPE may actively send the third information to the ACS or may send the third information to the ACS in response to a second request message of the ACS. For example, the ACS sends the second request message to the RAN, where the second request message is used to request to obtain the identifier of the one or more processing manners supported by the CPE; and correspondingly, after receiving the second request message, the CPE may send a second response message to the ACS, where the second response message includes the third information.

S1207: The CPE sends a first response message to the ACS; and correspondingly, the ACS receives the first response message.

In this embodiment, the first response message may be a parameter value query response message. However, the embodiments are not limited thereto. The first response message includes second data, second information, and fourth information. In this embodiment, the second information includes the identifier of the first processing manner. Optionally, the second information may further include a data recovery identifier. The data recovery identifier identifies a location of the second data in the first data. For example, the first processing manner is a compression algorithm based on a column subspace, and the data recovery identifier may be a column identifier of a column subspace of the first data and a location index of the second data in the first data. The second data, the second information, and the fourth information may be carried in a same message or may be carried in different messages. In FIG. 12, an example in which the second data, the second information, and the fourth information are carried in the same message is used.

S1208: The ACS determines the first data recovery manner based on the identifier of the first processing manner.

For example, the ACS obtains the identifier of the first processing manner based on the first response message, and then determines the first data recovery manner based on the identifier of the first processing manner and a correspondence between the first processing manner and the first data recovery manner.

In the foregoing embodiment, the CPE collects the first data, and sends partial data of the first data to the CPE, so that overheads of transmission resources between the CPE and the ACS can be reduced, and utilization of network resources can be improved. The CPE supports reporting the one or more processing manners and/or the one or more data recovery manners supported by the CPE to the ACS. In this way, the ACS may determine a proper target threshold based on a data processing capability of the CPE, a requirement of the ACS for accuracy, a bandwidth resource allocation status of the ACS, and the like. Further, the CPE obtains the second data from the first data in the first processing manner, and sends the identifier of the first processing manner to the ACS, so that the ACS can determine the first data recovery manner based on the identifier of the first processing manner and the correspondence between the first processing manner and the first data recovery manner, and obtain the third data in the first data recovery manner based on the second data. An error between the third data and the first data is less than or equal to the target threshold, so that accuracy of the parameter value can be improved.

Figure 13:
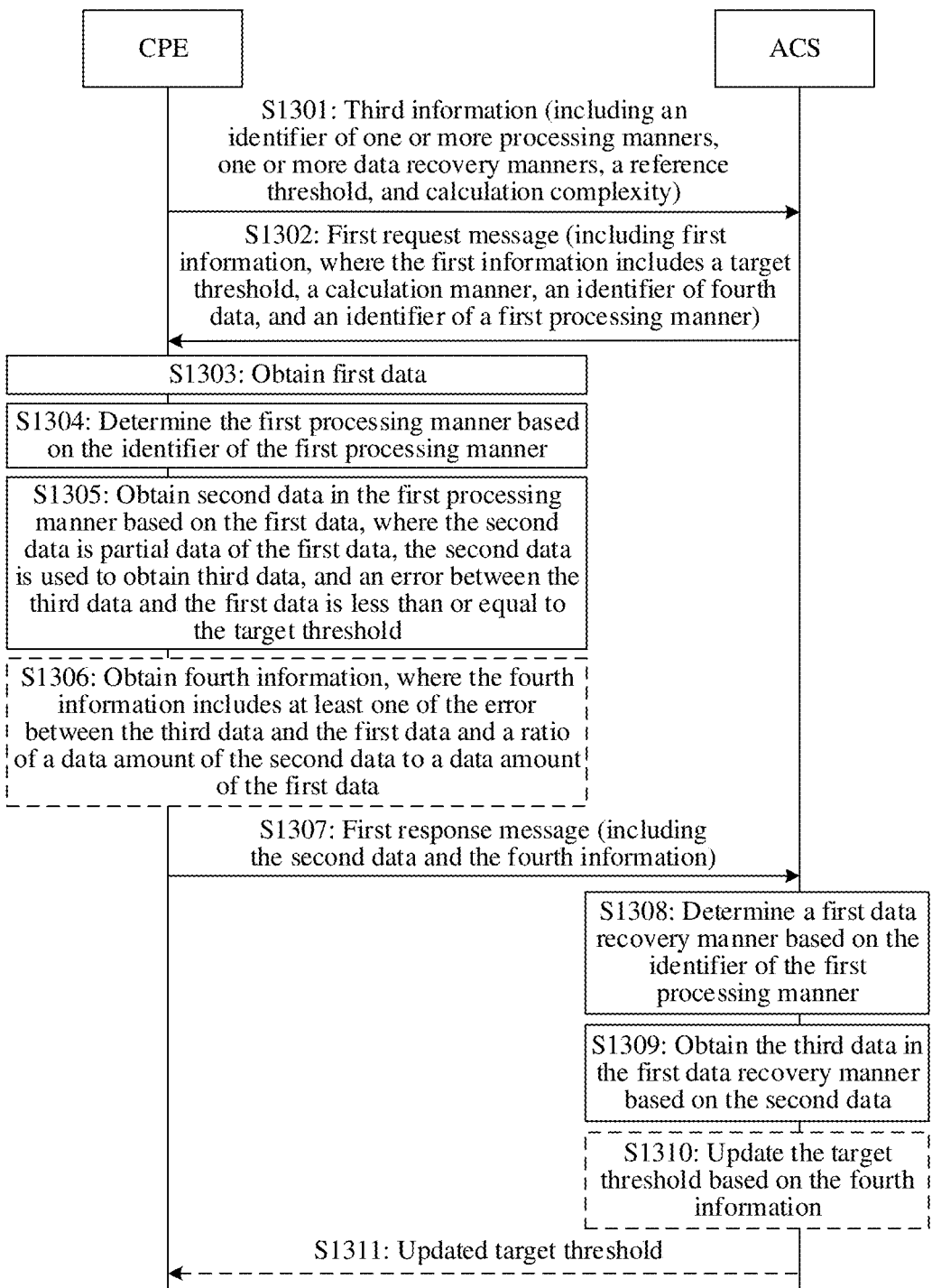
FIG. 13 is yet another schematic flowchart of a communication method according to an embodiment.

FIG. 13 is yet another schematic flowchart of a communication method according to an embodiment. This embodiment relates to a parameter value query service scenario. A first communication apparatus may be a CPE or a component (such as a chip or a chip system) of the CPE, and a second communication apparatus may be an ACS or a component (such as a chip or a chip system) of the ACS. A dashed line in FIG. 13 indicates that the step is an optional step, in other words, the step may be performed or may not be performed.

In this embodiment, the first communication apparatus sends an identifier of one or more processing manners supported by the first communication apparatus to the second communication apparatus, and the second communication apparatus sends an identifier of a first processing manner to the first communication apparatus. Step S1303, step S1305 and step S1306, step S1308 to S1311 are correspondingly the same as step S1203, step S1205 and step S1206, and step S1208 to step S1211 in FIG. 12, and differences between the two figures are as follows.

S1301: The CPE sends third information to the ACS; and correspondingly, the ACS receives the third information.

In this embodiment, the third information includes an identifier of one or more processing manners supported by the CPE, includes one or more data recovery manners (for example, a calculation formula of the one or more data recovery manners or a name of the one or more data recovery manners) supported by the CPE, or includes an identifier of one or more processing manners and one or more data recovery manners that are supported by the CPE. The identifier of the one or more processing manners includes the identifier of the first processing manner. The one or more processing manners are in one-to-one correspondence with the one or more data recovery manners. For example, when the processing manner is a compression algorithm based on a column subspace, the data recovery manner corresponding to the processing manner may be a data reconstruction formula.

Optionally, the third information may further include a reference threshold and calculation complexity of the one or more data recovery manners. In addition, for descriptions of the reference threshold, refer to related descriptions in the foregoing step S1201. Details are not described herein again. The calculation complexity of the one or more data recovery manners may be used to determine a target threshold (where for example, the target threshold is adaptively adjusted based on the calculation complexity and a data processing capability of the ACS), used to determine the first processing manner (for example, determine a processing manner corresponding to a data recovery manner with a minimum calculation complexity as the first processing manner), or used to determine a target threshold and the first processing manner. In other words, the ACS may determine the target threshold, determine the first processing manner, or determine the target threshold and the first processing manner based on one or more of the target threshold and the calculation complexity.

The CPE may actively send the third information to the ACS or may send the third information to the ACS in response to a second request message of the ACS. For an implementation process, refer to related descriptions of the foregoing step S1201. Details are not described herein again.

S1302: The ACS sends a first request message to the CPE; and correspondingly, the CPE receives the first request message.

The first request message is used to request to obtain first data. In this embodiment, the first request message may be a parameter value query request message. However, the embodiments are not limited thereto. The first request message may include first information, and the first information includes the target threshold, a calculation manner, an identifier of fourth data, and the identifier of the first processing manner. Optionally, the first request message may further include a parameter name of a target parameter. For example, the ACS may determine the target threshold based on one or more of the reference threshold, the one or more processing manners supported by the CPE, the calculation complexity of the one or more data recovery manners, a bandwidth resource allocation status of the ACS, a requirement of the ACS, and a data processing capability of the ACS. For another example, the ACS may determine the first processing manner based on one or more of the reference threshold, the one or more processing manners supported by the CPE, the calculation complexity of the one or more data recovery manners, a bandwidth resource allocation status of the ACS, a requirement of the ACS, and a data processing capability of the ACS. For another example, the ACS may determine the target threshold and the first processing manner based on one or more of the reference threshold, the one or more processing manners supported by the CPE, the calculation complexity of the one or more data recovery manners, a bandwidth resource allocation status of the ACS, a requirement of the ACS, and a data processing capability of the ACS.

S1304: The CPE determines the first processing manner based on the identifier of the first processing manner.

For example, the CPE may obtain the identifier of the first processing manner based on the first information, for example, parse the first information to obtain the identifier of the first processing manner. Further, the CPE may determine the first processing manner based on the identifier of the first processing manner.

S1307: The CPE sends a first response message to the ACS; and correspondingly, the ACS receives the first response message.

In this embodiment, the first response message may be a parameter value query response message. However, the embodiments are not limited thereto. The first response message includes second data and fourth information. Optionally, the first response message may further include a data recovery identifier. The data recovery identifier identifies a location of the second data in the first data. For example, the first processing manner is a compression algorithm based on a column subspace, and the data recovery identifier may be a column identifier of a column subspace of the first data and a location index of the second data in the first data.

In the foregoing embodiment, the CPE collects the first data, and sends partial data of the first data to the ACS, so that overheads of transmission resources between the CPE and the ACS can be reduced, and utilization of network resources can be improved. The CPE supports reporting the one or more processing manners and/or the one or more data recovery manners supported by the CPE to the ACS. In this way, the ACS may determine a proper target threshold based on a data processing capability of the CPE, a requirement of the ACS for accuracy, a data processing capability of the ACS, a bandwidth resource allocation status of the ACS, and the like. Further, the ACS supports indicating the first processing manner to the CPE, for example, sends the identifier of the first processing manner to the CPE. Correspondingly, the CPE may obtain the second data from the first data in the first processing manner. The second data may be used to obtain third data, and an error between the third data and the first data is less than or equal to the target threshold. The ACS may specify the first processing manner. For example, the first processing manner is determined based on the requirement of the ACS, an actual situation of the ACS, and the like. In this case, the second data that is obtained in the first processing manner and the third data that is determined based on the second data can meet the requirement of the ACS and meet the actual situation of the ACS.

The foregoing describes the solutions provided in the embodiments from a perspective of a device and a perspective of device interaction. It may be understood that, to implement the foregoing functions, each device may include a corresponding hardware structure and/or software module for performing each function. A person skilled in the art should easily be aware that, in combination with units and algorithm steps of the examples described in embodiments, the embodiments may be implemented by hardware or a combination of hardware and computer software. Whether a function is performed by hardware or hardware driven by computer software depends on particular applications and implementation constraints. A person skilled in the art may use different methods to implement the described functions, but it should not be considered that the implementation goes beyond the scope of the embodiments.

In the embodiments, division into functional units may be performed on the device based on the foregoing method examples. For example, each functional unit may be obtained through division based on each corresponding function, or two or more functions may be integrated into one unit. The integrated unit may be implemented in a form of hardware or may be implemented in a form of a software functional unit.

Figure 14:
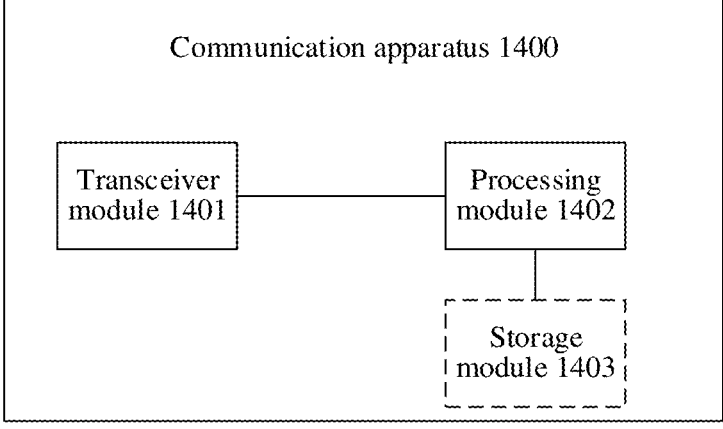
FIG. 14 is a diagram of a structure of a communication apparatus according to an embodiment.

When the integrated unit is used, FIG. 14 is a possible example block diagram of a communication apparatus according to an embodiment. As shown in FIG. 14, the communication apparatus 1400 may include a transceiver module 1401 and a processing module 1402. The processing module 1402 is configured to control and manage an action of the communication apparatus 1400. The transceiver module 1401 is configured to support the communication apparatus 1400 in communicating with another device, for example, performing sending and receiving operations under control of the processing module 1402. Optionally, the transceiver module 1401 may be one module, or may be two modules, for example, a receiving module and a sending module. Optionally, the communication apparatus 1400 may further include a storage module 1403, configured to store program code and/or data of the communication apparatus 1400.

In an example, the processing module 1402 may support the communication apparatus 1400 in performing a first communication apparatus or an action of a first communication apparatus in the foregoing method examples. Alternatively, the processing module 1402 can perform a first communication apparatus or an internal action of a first communication apparatus in the method examples.

For example, the communication apparatus 1400 may be the first communication apparatus in the foregoing embodiments or may be a component (such as a chip) of the first communication apparatus in the foregoing embodiments. The processing module 1402 is configured to obtain first data and obtain second data in a first processing manner based on the first data, where the second data is partial data of the first data, the second data is used to obtain third data, and an error between the third data and the first data is less than or equal to a target threshold. The transceiver module 1401 is configured to send the second data to a second communication apparatus.

In a possible implementation, the transceiver module 1401 may be further configured to receive first information from the second communication apparatus, where the first information includes one or more of the following: the target threshold, a calculation manner, and an identifier of fourth data, where the calculation manner is used to determine the error between the third data and the first data, the fourth data is data that needs to be sent by the first communication apparatus, and the second data includes the fourth data; and the processing module 1402 may be further configured to determine the first processing manner based on the first information.

In a possible implementation, the transceiver module 1401 may be further configured to send second information to the second communication apparatus, where the second information includes a first data recovery manner, the first data recovery manner corresponds to the first processing manner, and the first data recovery manner is used to obtain the third data based on the second data; or the second information includes an identifier of the first processing manner.

In a possible implementation, the first information may further include the identifier of the first processing manner, and when determining the first processing manner based on the first information, the processing module 1402 may be configured to: determine the first processing manner based on the identifier of the first processing manner.

In a possible implementation, the transceiver module 1401 may be further configured to send third information to the second communication apparatus, where the third information includes an identifier of one or more processing manners supported by the first communication apparatus, and the identifier of the one or more processing manners includes the identifier of the first processing manner.

In a possible implementation, the transceiver module 1401 may be further configured to send fourth information to the second communication apparatus, where the fourth information includes one or more of the following:
the error between the third data and the first data; and
a ratio of a data amount of the second data to a data amount of the first data.

Optionally, the transceiver module 1401 may be further configured to receive an updated target threshold from the second communication apparatus.

In a possible implementation, the first communication apparatus is an element management apparatus, and the second communication apparatus is a network management apparatus; or
the first communication apparatus is an access network element, and the second communication apparatus is an element management apparatus; or
the first communication apparatus is an access network element, and the second communication apparatus is a network management apparatus; or the first communication apparatus is a customer premises equipment, and the second communication apparatus is an auto-configuration server.

For another example, the communication apparatus 1400 may be the second communication apparatus in the foregoing embodiments or may be a component (such as a chip) of the second communication apparatus in the foregoing embodiments. The transceiver module 1401 is configured to receive second data from a first communication apparatus, where the second data is partial data of first data. The processing module 1402 is configured to obtain third data in a first data recovery manner based on the second data, where a difference between the third data and the first data is less than or equal to a target threshold.

In a possible implementation, the transceiver module 1401 may be further configured to send first information to the first communication apparatus, where the first information includes at least one of the target threshold, a calculation manner, or an identifier of fourth data, the calculation manner is used to determine the error between the third data and the first data, the fourth data is data that needs to be sent by the first communication apparatus, and the second data includes the fourth data.

In a possible implementation, the first communication apparatus is an access network element, the second communication apparatus is an element management apparatus, and the transceiver module 1401 may be further used by the second communication apparatus to send the third data to a network management apparatus.

In a possible implementation, the transceiver module 1401 may be further configured to receive the first information from the network management apparatus.

In a possible implementation, the transceiver module 1401 may be further configured to: receive second information from the first communication apparatus, where the second information includes the first data recovery manner or an identifier of a first processing manner, the first processing manner corresponds to the first data recovery manner, and the first processing manner is used to obtain the second data from the first data; and determine, by the second communication apparatus, the first data recovery manner based on the second information.

In a possible implementation, the first information further includes the identifier of the first processing manner, the first processing manner corresponds to the first data recovery manner, and the first processing manner is used to obtain the second data from the first data. The processing module 1402 may be further configured to determine the first data recovery manner based on the identifier of the first processing manner.

In a possible implementation, the transceiver module 1401 may be further configured to receive third information from the first communication apparatus, where the third information includes an identifier of one or more processing manners supported by the first communication apparatus, and the identifier of the one or more processing manners includes the identifier of the first processing manner.

In a possible implementation, the transceiver module 1401 may be further configured to receive fourth information from the first communication apparatus, where the fourth information includes at least one of an error between the third data and the first data and a ratio of a data amount of the second data to a data amount of the first data.

In a possible implementation, the processing module 1402 may be further configured to update the target threshold based on the fourth information; and the transceiver module

1401 may be further configured to send an updated target threshold to the first communication apparatus.

In a possible implementation, the first communication apparatus is an element management apparatus, and the second communication apparatus is a network management apparatus; or the first communication apparatus is an access network element, and the second communication apparatus is an element management apparatus; or the first communication apparatus is an access network element, and the second communication apparatus is a network management apparatus; or the first communication apparatus is a customer premises equipment, and the second communication apparatus is an auto-configuration server.

Unit division in the foregoing apparatus is merely logical function division. In actual implementation, all or some of the units may be integrated into one physical entity or may be physically separated. In addition, all the units in the apparatus may be implemented in a form of software invoked by a processing element; or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. In addition, each unit may also be stored in a memory in a form of a program and invoked by a processing element of the apparatus to perform a function of the unit. In addition, all or some of these units may be integrated together or may be implemented independently. The processing element herein may also be a processor and may be an integrated circuit having a signal processing capability. In an implementation process, the operations in the foregoing methods or the foregoing units may be implemented through an integrated logic circuit of hardware in the processor element or may be implemented in a form of software being invoked by the processing element.

In an example, a unit in any one of the foregoing apparatuses may be one or more integrated circuits configured to implement the foregoing method, for example, one or more application-specific integrated circuits (ASIC), one or more microprocessors (DSP), one or more field programmable gate arrays (FPGA), or a combination of at least two of these integrated circuit forms. For another example, when the unit in the apparatus may be implemented in a form of scheduling a program by the processing element, the processing element may be a processor, for example, a general-purpose central processing unit (CPU), or another processor that can invoke the program. For another example, these units may be integrated together and implemented in a form of a system-on-a-chip (SoC).

The foregoing unit for receiving is an interface circuit of the apparatus and is configured to receive a signal from another apparatus. For example, when the apparatus is implemented in a manner of a chip, the receiving unit is an interface circuit that is of the chip and that is configured to receive a signal from another chip or apparatus. The foregoing unit for sending is an interface circuit of the apparatus and is configured to send a signal to another apparatus. For example, when the apparatus is implemented in a manner of a chip, the sending unit is an interface circuit that is of the chip and that is configured to send a signal to another chip or apparatus.

Figure 15:
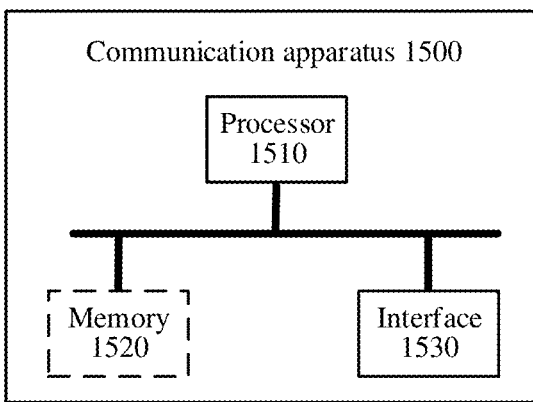
FIG. 15 is still another diagram of a structure of a communication apparatus according to an embodiment.

FIG. 15 is a diagram of a communication apparatus according to an embodiment. The communication apparatus is configured to implement the operations of the first communication apparatus or the second communication apparatus in the foregoing embodiments. The communication apparatus 1500 includes a processor 1510 and an interface 1530. Optionally, the communication apparatus 1500 further includes a memory 1520. The interface 1530 is configured to implement communication with another device.

In the foregoing embodiments, the method performed by the first communication apparatus or the second communication apparatus may be implemented by the processor 1510 by invoking a program stored in a memory (which may be the memory 1520 in the first communication apparatus or the second communication apparatus, or an external memory). In other words, the communication apparatus 1500 configured to implement a function of the first communication apparatus or the second communication apparatus may include the processor 1510. The processor 1510 invokes the program in the memory, to perform the method performed by the first communication apparatus or the second communication apparatus in the foregoing method embodiments. The processor herein may be an integrated circuit having a signal processing capability, for example, a CPU. The apparatus configured for the first communication apparatus and the second communication apparatus may be implemented by configuring one or more integrated circuits that implement the foregoing method, for example, one or more ASICs, one or more microprocessors DSPs, one or more FPGAs, or a combination of at least two of these integrated circuit forms. Alternatively, the foregoing implementations may be combined.

When the communication apparatus 1500 is configured to implement the foregoing method, the processor 1510 is configured to implement a function of the processing module 1402, and the interface 1530 is configured to implement a function of the transceiver module 1401.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wireline (for example, a coaxial cable, an optical fiber, or a digital subscriber line (DSL)) or wireless (for example, infrared, radio, or microwave) manner. The non-transitory computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or an implementation of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments may be directly embedded into hardware, a software unit executed by a processor, or a combination thereof. The software unit may be stored in a random access memory (RAM), a flash memory, a read-only memory (ROM), an EPROM memory, an EEPROM memory, a register, a hard disk, a removable magnetic disk, a CD-ROM, or a storage medium in any other form in the art. For example, the storage medium may connect to a processor so that the processor may read information from the storage medium and write information to the storage medium. Optionally, the storage medium may be integrated into a processor. The processor and the storage media may be disposed in an ASIC.

These computer program instructions may also be loaded onto a computer or another programmable data processing device, so that a series of operation steps are performed on the computer or the another programmable device to generate computer-implemented processing. In this way, instructions executed on the computer or the another programmable device provide steps for implementing functions specified in one or more procedures in a flowchart and/or one or more blocks in a block diagram.

In one or more example implementations, the functions described in the embodiments may be implemented by using hardware, software, firmware, or any combination thereof. If the embodiments are implemented by software, these functions may be stored in a non-transitory computer-readable medium or are transmitted to the computer-readable medium in a form of one or more instructions or code. The non-transitory computer-readable medium is either a computer storage medium or a communication medium that enables a computer program to move from one place to another. The storage media may be an available medium that may be accessed by any general or special computer. For example, such a non-transitory computer-readable medium may include, but is not limited to, a RAM, a ROM, an EEPROM, a CD-ROM, or another optical disc storage, a disk storage or another magnetic storage apparatus, or any other medium that may be used to carry or store program code, where the program code is in a form of instructions or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disk and the disc include a compact disc, a laser disc, an optical disc, a digital versatile disc (DVD), a floppy disk, and a Blu-ray disc. The disc may copy data in a magnetic manner, and the disk may copy data optically in a laser manner. The foregoing combination may also be included in the non-transitory computer-readable medium.

A person skilled in the art should be aware that, in one or more of the foregoing examples, the functions described in the embodiments may be implemented by using hardware, software, firmware, or any combination thereof.

The objectives, solutions, and beneficial effects of the embodiments are further described in detail in the foregoing implementations. It should be understood that, the foregoing descriptions are merely implementations of the embodiments, and are not intended to limit the scope of the embodiments, any modification, equivalent replacement, improvement, or the like made based on the embodiments shall fall within the scope of the embodiments. According to the foregoing descriptions, technologies in the art can use or implement the content in the embodiments. Any modification based on the included content should be considered definite in the art, and basic principles described in the embodiments may be applied to other variations without departing from the essence and scope of the embodiments. Therefore, the content in the embodiments is not merely limited to the described embodiments and implementations but may also be extended to a maximum scope consistent with the principles and new features described in the embodiments.

Although described with reference to the embodiments thereof, it is clear that, various modifications and combinations may be made to them without departing from the spirit and scope of the embodiments. It is clear that a person skilled in the art can make various modifications and variations without departing from the scope of the embodiments. In this case, the embodiments are intended to cover these modifications and variations of the embodiments.

What is claimed is:

1. A method comprising:
obtaining, by a first communication apparatus, first data, wherein the first data is network measurement data;
obtaining, by the first communication apparatus, second data in a first processing manner based on the first data, wherein the second data is partial data of the first data, the second data is used to obtain third data, and an error between the third data and the first data is less than or equal to a target threshold;
sending, by the first communication apparatus, the second data to a second communication apparatus;
sending, by the first communication apparatus, fourth information to the second communication apparatus, wherein the fourth information comprises at least one of the following:
the error between the third data and the first data; and
a ratio of a data amount of the second data to a data amount of the first data;
receiving, by the first communication apparatus, an updated target threshold from the second communication apparatus.

2. The method according to claim 1, further comprising:
receiving, by the first communication apparatus, first information from the second communication apparatus, wherein the first information comprises at least one of the target threshold, a calculation manner, or an identifier of fourth data, the calculation manner is used to determine the error between the third data and the first data, the fourth data is data that needs to be sent by the first communication apparatus, and the second data comprises the fourth data; and determining, by the first communication apparatus, the first processing manner based on the first information.

3. The method according to claim 2, further comprising:

sending, by the first communication apparatus, second information to the second communication apparatus, wherein the second information comprises a first data recovery manner, the first data recovery manner corresponds to the first processing manner, and the first data recovery manner is used to obtain the third data based on the second data; or the second information comprises an identifier of the first processing manner.

4. The method according to claim 2, wherein the first information further comprises an identifier of the first processing manner, and determining, by the first communication apparatus, the first processing manner based on the first information further comprises:

determining, by the first communication apparatus, the first processing manner based on the identifier of the first processing manner.

5. The method according to claim 3, further comprising:

sending, by the first communication apparatus, third information to the second communication apparatus, wherein the third information comprises an identifier of one or more processing manners supported by the first communication apparatus, and the identifier of the one or more processing manners comprises the identifier of the first processing manner.

6. A method comprising:

receiving, by a second communication apparatus, second data from a first communication apparatus, wherein the second data is partial data of first data, and the first data is network measurement data;

obtaining, by the second communication apparatus, third data in a first data recovery manner based on the second data, wherein a difference between the third data and the first data is less than or equal to a target threshold;

receiving, by the second communication apparatus, fourth information from the first communication apparatus, wherein the fourth information comprises at least one of the following:

the error between the third data and the first data; and a ratio of a data amount of the second data to a data amount of the first data;

updating, by the second communication apparatus, the target threshold based on the fourth information; and sending, by the second communication apparatus, an updated target threshold to the first communication apparatus.

7. The method according to claim 6, further comprising:

sending, by the second communication apparatus, first information to the first communication apparatus, wherein the first information comprises at least one of the target threshold, a calculation manner, or an identifier of fourth data, the calculation manner is used to determine the error between the third data and the first data, the fourth data is data that needs to be sent by the first communication apparatus, and the second data comprises the fourth data.

8. The method according to claim 7, wherein the first communication apparatus is an access network element, the second communication apparatus is an element management apparatus, and further comprising:

sending, by the second communication apparatus, the third data to a network management apparatus.

9. The method according to claim 8, further comprising:

receiving, by the second communication apparatus, the first information from the network management apparatus.

10. The method according to claim 8, further comprising:

receiving, by the second communication apparatus, second information from the first communication apparatus, wherein the second information comprises the first data recovery manner or an identifier of a first processing manner, the first processing manner corresponds to the first data recovery manner, and the first processing manner is used to obtain the second data from the first data; and determining, by the second communication apparatus, the first data recovery manner based on the second information.

11. The method according to claim 7, wherein the first information further comprises an identifier of a first processing manner, the first processing manner corresponds to the first data recovery manner, and the first processing manner is used to obtain the second data from the first data; and further comprising:

determining, by the second communication apparatus, the first data recovery manner based on the identifier of the first processing manner.

12. The method according to claim 10, further comprising:

receiving, by the second communication apparatus, third information from the first communication apparatus, wherein the third information comprises an identifier of one or more processing manners supported by the first communication apparatus, and the identifier of the one or more processing manners comprises the identifier of the first processing manner.

13. A method applied to a communication system comprising a first communication apparatus and a second communication apparatus, wherein the method comprises:

obtaining, by the first communication apparatus, first data, obtaining second data in a first processing manner based on the first data, and sending the second data to the second communication apparatus, wherein the first data is network measurement data, and the second data is partial data of the first data;

receiving, by the second communication apparatus, the second data from the first communication apparatus, and obtaining third data in a first data recovery manner based on the second data, wherein a difference between the third data and the first data is less than or equal to a target threshold;

sending, by the first communication apparatus, fourth information to the second communication apparatus, wherein the fourth information comprises at least one of the following:

the error between the third data and the first data; and a ratio of a data amount of the second data to a data amount of the first data;

receiving, by the first communication apparatus, an updated target threshold from the second communication apparatus.

14. The method according to claim 13, further comprising:

sending, by the second communication apparatus, first information to the first communication apparatus, wherein the first information comprises at least one of the target threshold, a calculation manner, or an identifier of fourth data, the calculation manner is used to determine the error between the third data and the first data, the fourth data is data that needs to be sent by the first communication apparatus, and the second data comprises the fourth data; and receiving, by the first communication apparatus, the first information from the second communication apparatus, and determining the first processing manner based on the first information.

15. The method according to claim 14, wherein the first communication apparatus is an access network element, the second communication apparatus is an element management apparatus, and further comprising:

sending, by the second communication apparatus, the third data to a network management apparatus.

16. The method according to claim 15, further comprising:

receiving, by the second communication apparatus, the first information from the network management apparatus.

* * * * *